(12) United States Patent
Aghdaie et al.

(10) Patent No.: US 11,786,825 B2
(45) Date of Patent: Oct. 17, 2023

(54) FRAUD DETECTION SYSTEM

(71) Applicant: Electronic Arts Inc., Redwood City, CA (US)

(72) Inventors: Navid Aghdaie, San Jose, CA (US); John Kolen, Half Moon Bay, CA (US); Mohamed Marwan Mattar, San Francisco, CA (US); Mohsen Sardari, Redwood City, CA (US); Su Xue, Fremont, CA (US); Kazi Atif-Uz Zaman, Foster City, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

(21) Appl. No.: 17/455,861

(22) Filed: Nov. 19, 2021

(65) Prior Publication Data

US 2022/0176254 A1    Jun. 9, 2022

Related U.S. Application Data

(63) Continuation of application No. 16/849,922, filed on Apr. 15, 2020, now Pat. No. 11,179,639, which is a
(Continued)

(51) Int. Cl.
    *A63F 13/79* (2014.01)
    *A63F 13/70* (2014.01)

(52) U.S. Cl.
    CPC .............. *A63F 13/79* (2014.09); *A63F 13/70* (2014.09); *A63F 2300/535* (2013.01); *A63F 2300/5586* (2013.01)

(58) Field of Classification Search
    CPC .......... A63F 13/70; A63F 13/75; A63F 13/79; A63F 2300/535; A63F 2300/5586
    See application file for complete search history.

(56) References Cited

U.S. PATENT DOCUMENTS 2,063,100 A * 12/1936 Johnsen ............... F25C 1/246
                                                          249/52
6,769,016 B2    7/2004 Rothwell et al.
(Continued)

FOREIGN PATENT DOCUMENTS

JP    2003126555 A  *  5/2003
JP    2009187143 A  *  8/2009
(Continued)

OTHER PUBLICATIONS

Alex Beutel, Wanhong Xu, Venkatesan Guruswami, Christopher Palow, and Christos Faloutsos. "Copycatch: stopping group attacks by spotting lockstep behavior in social networks." In WWW, pp. 119-130. ACM, 2013.
(Continued)

*Primary Examiner* — Steven J Hylinski
(74) *Attorney, Agent, or Firm* — Knobbe, Martens, Olson & Bear, LLP

(57) ABSTRACT

Embodiments of an automated fraud detection system are disclosed that can detect user accounts that are engaging in unauthorized activities within a game application. The fraud detection system can provide an automated system that identifies parasitic accounts. The fraud detection system may identify patterns using machine learning based on characteristics, such as gameplay and transaction characteristics, associated with the parasitic user accounts. The fraud detection system may generate a model that can be applied to existing accounts within the game in order to automatically identify users that are engaging in unauthorized activities. The fraud detection system may automatically identify these parasitic accounts and implement appropriate actions to prevent the accounts from impacting legitimate users within the game application.

20 Claims, 12 Drawing Sheets

Related U.S. Application Data continuation of application No. 16/109,507, filed on Aug. 22, 2018, now abandoned, which is a continuation of application No. 14/929,161, filed on Oct. 30, 2015, now abandoned.

(56) References Cited

U.S. PATENT DOCUMENTS

| | | | |
|---|---|---|---|
| 7,721,336 B1 | 5/2010 | Adjaoute | |
| 7,877,482 B1 | 1/2011 | Ashcraft et al. | |
| 7,974,849 B1 | 7/2011 | Begole et al. | |
| 8,370,389 B1 | 2/2013 | Dotan | |
| 8,589,174 B2 | 11/2013 | Nelson et al. | |
| 8,635,117 B1* | 1/2014 | Acuna-Rohter | G06Q 20/40 705/26.35 |
| 8,661,547 B1 | 2/2014 | Kononov et al. | |
| 8,726,379 B1* | 5/2014 | Stiansen | H04L 63/1441 726/25 |
| 8,794,508 B1 | 8/2014 | Pascal | |
| 8,881,266 B2 | 11/2014 | Chow et al. | |
| 9,112,895 B1 | 8/2015 | Lin | |
| 9,231,936 B1 | 1/2016 | Wang et al. | |
| 9,517,402 B1 | 12/2016 | Vogel | |
| 9,529,777 B2 | 12/2016 | Tjew et al. | |
| 9,785,988 B2* | 10/2017 | Petri | G06Q 30/0609 |
| 9,942,250 B2 | 4/2018 | Stiansen et al. | |
| 9,992,018 B1 | 6/2018 | Tjew et al. | |
| 10,069,852 B2 | 9/2018 | Turgeman et al. | |
| 10,193,772 B1 | 1/2019 | Tjew et al. | |
| 10,204,374 B1 | 2/2019 | Holan et al. | |
| 10,242,032 B2 | 3/2019 | Sundaresan et al. | |
| 10,427,048 B1 | 10/2019 | Lundquist et al. | |
| 10,459,827 B1 | 10/2019 | Aghdaie et al. | |
| 10,460,320 B1 | 10/2019 | Cao et al. | |
| 10,997,599 B2 | 5/2021 | Adjaoute | |
| 11,040,285 B1 | 6/2021 | Lundquist et al. | |
| 11,179,639 B1 | 11/2021 | Aghdaie et al. | |
| 2002/0133721 A1 | 9/2002 | Adjaoute | |
| 2002/0165838 A1 | 11/2002 | Vetter | |
| 2004/0039630 A1 | 2/2004 | Begole et al. | |
| 2005/0014559 A1 | 1/2005 | Mattice et al. | |
| 2005/0091524 A1 | 4/2005 | Abe et al. | |
| 2005/0108384 A1 | 5/2005 | Lambert et al. | |
| 2006/0036727 A1 | 2/2006 | Kurapati et al. | |
| 2006/0093142 A1 | 5/2006 | Schneier et al. | |
| 2007/0043851 A1 | 2/2007 | Yellamraju et al. | |
| 2007/0111794 A1 | 5/2007 | Hogan et al. | |
| 2007/0121596 A1 | 5/2007 | Kurapati et al. | |
| 2007/0266394 A1 | 11/2007 | Odent et al. | |
| 2008/0059474 A1 | 3/2008 | Lim | |
| 2008/0065994 A1 | 3/2008 | Wang et al. | |
| 2008/0147354 A1* | 6/2008 | Rowan | G06Q 30/02 702/182 |
| 2008/0207327 A1* | 8/2008 | Van Luchene | G06N 3/006 463/42 |
| 2008/0209544 A1 | 8/2008 | Kempka | |
| 2008/0310312 A1 | 12/2008 | Acharya et al. | |
| 2009/0054123 A1 | 2/2009 | Mityagin et al. | |
| 2009/0143144 A1 | 6/2009 | Schluessler et al. | |
| 2009/0164788 A1 | 6/2009 | Cho et al. | |
| 2009/0219895 A1 | 9/2009 | Wu | |
| 2009/0235226 A1 | 9/2009 | Murthy et al. | |
| 2009/0300589 A1* | 12/2009 | Watters | G06Q 40/00 717/140 |
| 2010/0094768 A1* | 4/2010 | Miltonberger | G06Q 30/0185 345/440.2 |
| 2010/0162405 A1 | 6/2010 | Cook et al. | |
| 2010/0227675 A1* | 9/2010 | Luxton | G07F 17/3281 463/25 |
| 2011/0012603 A1 | 1/2011 | Bose et al. | |
| 2011/0145137 A1* | 6/2011 | Driemeyer | G06Q 20/10 705/39 |
| 2011/0167269 A1 | 7/2011 | Baykal et al. | |
| 2012/0036250 A1 | 2/2012 | Vaswani et al. | |
| 2012/0047578 A1 | 2/2012 | Lee et al. | |
| 2012/0093370 A1 | 4/2012 | Ding et al. | |
| 2012/0130853 A1 | 5/2012 | Petri et al. | |
| 2012/0130856 A1* | 5/2012 | Petri | G06Q 30/0623 705/26.61 |
| 2012/0137367 A1 | 5/2012 | Dupont et al. | |
| 2013/0072306 A1 | 3/2013 | Parnprome | |
| 2013/0296039 A1 | 11/2013 | Engineer et al. | |
| 2013/0311977 A1 | 11/2013 | Nieminen et al. | |
| 2014/0304054 A1* | 10/2014 | Orun | G06Q 30/0225 705/14.26 |
| 2015/0106927 A1 | 4/2015 | Ferragut et al. | |
| 2015/0142595 A1* | 5/2015 | Acuna-Rohter | G06Q 20/40 705/21 |
| 2015/0238866 A1 | 8/2015 | Khabazian | |
| 2015/0317749 A1* | 11/2015 | Soviany | G06F 16/22 705/30 |
| 2015/0341379 A1 | 11/2015 | Lefebvre et al. | |
| 2016/0110528 A1 | 4/2016 | Gupta et al. | |
| 2016/0142435 A1 | 5/2016 | Bernstein et al. | |
| 2016/0191654 A1 | 6/2016 | Healey et al. | |
| 2016/0217022 A1 | 7/2016 | Velipasaoglu et al. | |
| 2016/0342963 A1 | 11/2016 | Zoldi et al. | |
| 2016/0359870 A1 | 12/2016 | Gu et al. | |
| 2017/0060656 A1 | 3/2017 | Bhattacharya et al. | |
| 2017/0076217 A1 | 3/2017 | Krumm et al. | |
| 2017/0098067 A1 | 4/2017 | Paluri et al. | |
| 2017/0111378 A1 | 4/2017 | Caffrey | |
| 2017/0134415 A1 | 5/2017 | Muddu et al. | |
| 2017/0223036 A1 | 8/2017 | Muddu et al. | |
| 2019/0213498 A1 | 7/2019 | Adjaoute | |

FOREIGN PATENT DOCUMENTS

| | | | | |
|---|---|---|---|---|
| KR | 20020023903 A | * | 3/2002 | |
| KR | 20060042363 A | * | 12/2006 | |
| WO | WO-2004025411 A2 | * | 3/2004 | G06N 5/025 |

OTHER PUBLICATIONS

"Blizzard Entertainment Uses Spyware to Verify EULA Compliance", Schneier on Security, posted Oct. 13, 2005, retrieved Aug. 14, 2015, http://www.schneier.com/blog/archives/2005/10/blizzard_entert.html, 25 pgs.

Bokai Cao, Francine Chen, Dhiraj Joshi, and Philip S Yu. "Inferring crowd-sourced venues for tweets." IEEE Big Data, pp. 639-648. IEEE, 2015.

Bokai Cao, Xiangnan Kong, and Philip S Yu. "Collective prediction of multiple types of links in heterogeneous information networks." In ICDM, pp. 50-59. IEEE, 2014.

Qiang Cao, Michael Sirivianos, Xiaowei Yang, and Tiago Pregueiro. "Aiding the detection of fake accounts in large scale social online services." In NSDI, pp. 197-210, 2012.

Cao, Qiang, et al. "Aiding the Detection of Fake Accounts in Large Scale Social Online Services", http://www.usenix.org/system/files/conference/nsdi12/nsdi12-final42_2.pdf, accessed Aug. 6, 2015, 14 pgs.

William Eberle and Lawrence Holder. "Discovering structural anomalies in graph-based data." ICDMW, pp. 393-398. IEEE, 2007.

Jing Gao, Feng Liang, Wei Fan, Chi Wang, Yizhou Sun, and Jiawei Han. "On community outliers and their efficient detection in information networks." In KDD, pp. 813-822. ACM, 2010.

Saptarshi Ghosh, Bimal Viswanath, Farshad Kooti, Naveen Kumar Sharma, Gautam Korlam, Fabricio Benevenuto, Niloy Ganguly, and Krishna Phani Gummadi. "Understanding and combating link farming in the twitter social network." In WWW, pp. 61-70. ACM, 2012.

Manish Gupta, Jing Gao, Xifeng Yan, Hasan Cam, and Jiawei Han. "On detecting association-based clique outliers in heterogeneous information networks." In ASONAM, pp. 108-115. IEEE, 2013.

Manish Gupta, Arun Mallya, Subhro Roy, Jason HD Cho, and Jiawei Han. "Local learning for mining outlier subgraphs from network datasets." In SDM. SIAM, 2014.

Zoltán Gyöngyi, Hector Garcia-Molina, and Jan Pedersen. "Combating web spam with trustrank." In VLDB, pp. 576-587. VLDB Endowment, 2004.

(56) References Cited

OTHER PUBLICATIONS

Bryan Hooi, Hyun Ah Song, Alex Beutel, Neil Shah, Kijung Shin, and Christos Faloutsos. "Fraudar: Bounding graph fraud in the face of camouage." In KDD. ACM, 2016.

Ming Ji, Jiawei Han, and Marina Danilevsky. "Ranking-based classification of heterogeneous information networks." In KDD, pp. 1298-1306. ACM, 2011.

Meng Jiang, Peng Cui, Alex Beutel, Christos Faloutsos, and Shiqiang Yang. "Catchsync: catching synchronized behavior in large directed graphs." In KDD, pp. 941-950. ACM, 2014.

Nitin Jindal and Bing Liu. "Opinion spam and analysis." In WSDM, pp. 219-230. ACM, 2008.

Xiangnan Kong, Bokai Cao, and Philip S Yu. "Multi-label classification by mining label and instance correlations from heterogeneous information networks." In KDD, pp. 614-622. ACM, 2013.

Xiangnan Kong, Philip S Yu, Ying Ding, and David J Wild. "Meta path-based collective classification in heterogeneous information networks." In CIKM, pp. 1567-1571. ACM, 2012.

Chao Liu, Xifeng Yan, Hwanjo Yu, Jiawei Han, and S Yu Philip. "Mining behavior graphs for "backtrace" of noncrashing bugs." In SDM, pp. 286-297. SIAM, 2005.

Qing Lu and Lise Getoor. "Link-based classification." In ICML, vol. 3, pp. 496-503, 2003.

Emaad Manzoor, Sadegh M Milajerdi, and Leman Akoglu. "Fast memory-efficient anomaly detection in streaming heterogeneous graphs." In KDD. ACM, 2016.

Jennifer Neville and David Jensen. "Iterative classification in relational data." In AAAI Workshop on Learning Statistical Models from Relational Data, pp. 13-20, 2000.

Jennifer Neville and David Jensen. Collective classification with relational dependency networks. In KDD Workshop on Multi-Relational Data Mining, pp. 77-91. Citeseer, 2003.

Caleb C Noble and Diane J Cook. "Graph-based anomaly detection." In KDD, pp. 631-636. ACM, 2003.

Myle Ott, Yejin Choi, Claire Cardie, and Jeffrey T Hancock. "Finding deceptive opinion spam by any stretch of the imagination." In ACL, pp. 309-319. ACL, 2011.

Bryan Perozzi and Leman Akoglu. "Scalable anomaly ranking of attributed neighborhoods." In SDM. SIAM, 2016.

Bryan Perozzi, Leman Akoglu, Patricia Iglesias Sanchez, and Emmanuel Muller. "Focused clustering and outlier detection in large attributed graphs." In KDD, pp. 1346-1355. ACM, 2014.

Prithviraj Sen, Galileo Namata, Mustafa Bilgic, Lise Getoor, Brian Galligher, and Tina Eliassi-Rad. "Collective classification in network data." AI magazine, 29(3):93, 2008.

Neil Shah, Alex Beutel, Brian Gallagher, and Christos Faloutsos. "Spotting suspicious link behavior with fbox: An adversarial perspective." In ICDM, pp. 959-964. IEEE, 2014.

Yizhou Sun, Jiawei Han, Xifeng Yan, Philip S Yu, and Tianyi Wu. "PathSim: Meta path-based top-K similarity search in heterogeneous information networks." In VLDB, 2011.

Yizhou Sun, Yintao Yu, and Jiawei Han. "Ranking-based clustering of heterogeneous information networks with star network schema." In KDD, pp. 797-806. ACM, 2009.

Ward, Mark, "Warcraft Game Maker in Spying Row", BBC News, published Oct. 31, 2005, retrieved Aug. 14, 2015, 1 pg.

Baoning Wu, Vinay Goel, and Brian D Davison. "Propagating trust and distrust to demote web spam." MTW, 190, 2006.

* cited by examiner

FRAUD DETECTION SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.7.

BACKGROUND

Video games have increased in popularity and complexity in recent years. Today's video games have many more features and can sometimes be much more difficult than video games of the past. Many users enjoy the challenge of today's difficult video games. However, some users are easily frustrated. Some of these users may keep practicing until they get better at the video game or will just stop playing the video game if they find it too challenging. In order to overcome the difficulty, some unauthorized vendors help users cheat in video games by providing virtual goods and services for payment. These purchases can provide a user with an unfair advantage over other users and disturb the economic balance within game applications. This can result in a degraded experience for players that are legitimately playing the game without engaging the services of unauthorized vendors.

SUMMARY OF EMBODIMENTS

The systems, methods, and devices of this disclosure each have several innovative aspects, no single one of which is solely responsible for the all of the desirable attributes disclosed herein.

One embodiment discloses a fraud detection computing system, the system comprising an application host server computing system including one or more processors and in electronic communication with a fraud detection server, the application host server computer system configured to execute and host instances of a game application and establish gameplay sessions with a plurality of users; an account data store configured to store user account information for the plurality of users, wherein a user account is associated with each user; the fraud detection server including one or more processors and in electronic communication with the application host server computing system, the fraud detection server comprising: an account information aggregation server configured to aggregate user account information from a plurality of user accounts, wherein user account information associated with a user account comprises gameplay characteristics associated with one or more gameplay sessions; an account analysis system configured to, for each user account: analyze a user account based, at least in part on a fraud detection model, wherein the fraud detection model defines a fraud detection category related to the game application, the fraud detection category associated with evaluation criteria; determine whether the user account satisfies the evaluation criteria of the fraud category based, at least in part, on the gameplay characteristics of the user account; and assign the user account to the fraud detection category if the user account satisfies the evaluation criteria; and an account modification system configured to automatically implement account actions on individual user accounts, based, at least in part, on the fraud detection category assigned to an individual user account.

Another embodiment discloses a computer implemented fraud detection method comprising accessing, by a fraud detection server, a plurality of user accounts from a user account data store, wherein each user account includes user account information comprising gameplay characteristics associated with execution of gameplay sessions of a game application within an interactive computing system; for individual user accounts of the plurality of user accounts, analyzing, by the fraud detection server, the user account based at least in part on a fraud detection model, wherein the fraud detection model defines a fraud detection category, the fraud detection category associated with evaluation criteria; determining, by the fraud detection server, whether the user account satisfies the evaluation criteria of the fraud category based at least in part on the gameplay characteristics of the user account; and assigning, by the fraud detection server, the user account to the fraud detection category if the user account satisfies the evaluation criteria; and automatically implementing, by the fraud detection server, an account action on the user account, based at least in part on the fraud detection category assigned to an individual user account.

Another embodiment discloses non-transitory computer readable medium comprising computer-executable instructions for fraud detection that, when executed by a computer, causes the computer to: accessing, by a fraud detection server, a plurality of user accounts from a user account data store, wherein each user account includes user account information comprising gameplay characteristics associated with execution of gameplay sessions of a game application within an interactive computing system; for individual user accounts of the plurality of user accounts, analyzing, by the fraud detection server, the user account based at least in part on a fraud detection model, wherein the fraud detection model defines a fraud detection category, the fraud detection category associated with evaluation criteria; determining, by the fraud detection server, whether the user account satisfies the evaluation criteria of the fraud category based at least in part on the gameplay characteristics of the user account; and assigning, by the fraud detection server, the user account to the fraud detection category if the user account satisfies the evaluation criteria; and automatically implementing, by the fraud detection server, an account action on the user account, based at least in part on the fraud detection category assigned to an individual user account.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Overview

Cheating by users within multiplayer games can severely disrupt and impact the enjoyment of playing the games for other users. For example, some players (sometimes referred to as users) can conduct transactions with unauthorized vendors to purchase goods and services that can provide an advantage within a game application. For example, a user may purchase virtual currency to purchase an item within a game. The item may provide a substantial in-game benefit in a competitive gaming environment. However, in order to purchase the item, a user may be required to play the game for a significant period of time. By purchasing the virtual currency from an unauthorized vendor, the user can bypass the requirements associated with obtaining the object. In order for other users to stay competitive within the game, the same or similar item must be purchased. This can result in inflation of a game economy and can discourage legitimate players from continuing to play the game. The game applications can have terms and conditions that users must agree to in order to play the game that prohibit such behavior. However, it can be difficult to enforce the agreements as it is often challenging to identify users that are engaging in the unauthorized activities.

One solution to this problem is to use an automated fraud detection system that can identify patterns of activity associated with user accounts that are engaging in activities that are in violation of the terms and conditions of a game application. These user accounts can be referred to as parasitic accounts. The fraud detection system can provide an automated system that identifies parasitic accounts. In addition, the fraud detection system can collect data associated with the parasitic accounts and compare the data to the legitimate accounts. The fraud detection system can also identify patterns using machine learning based on characteristics, such as gameplay and transaction characteristics, associated with the parasitic user accounts. In some embodiments, the fraud detection system can generate a model or electronic filter that can be applied to existing accounts within the game in order to automatically identify users that are engaging in unauthorized activities. The fraud detection system can automatically identify these parasitic accounts and implement appropriate actions to prevent the accounts from impacting legitimate users within the game application.

I. Overview of Fraud Detection System

Figure 1:
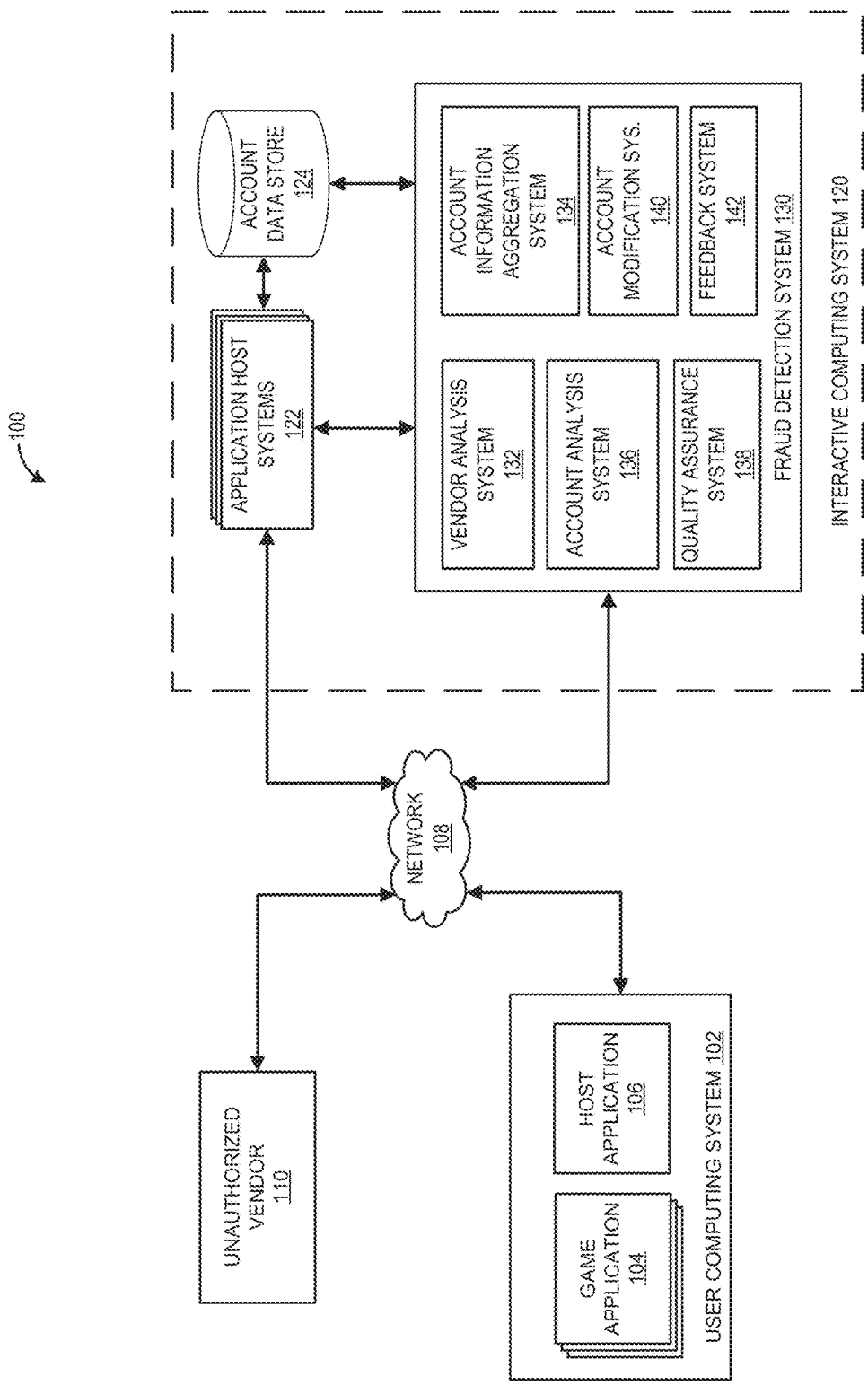
FIG. 1 illustrates an embodiment of a networked computing environment that can implement one or more embodiments of a fraud detection system.

FIG. 1 illustrates an embodiment of a computing environment 100 for implementing a fraud detection system 130. The environment 100 includes a network 108, a plurality of user computing systems 102, an unauthorized vendor 110, and an interactive computing system 120, which includes application host systems 122, an account data store 124, and a fraud detection system 130. To simplify discussion and not to limit the present disclosure, FIG. 1 illustrates only one user computing system 102, one unauthorized vendor 110, and one interactive computing system 120, though multiple systems may be used. The user computing system 102 may communicate via a network 108 with the interactive computing system 120. Although only one network 108 is illustrated, multiple distinct and/or distributed networks 108 may exist.

A. User Computing Systems

The user computing system 102 may include hardware and software components for establishing communications over a communication network 108. For example, the user systems 102 may be equipped with networking equipment and network software applications (for example, a web browser) that facilitate communications via one or more networks (for example, the Internet or an intranet). The user computing system 102 may have varied local computing resources such as central processing units and architectures, memory, mass storage, graphics processing units, communication network availability and bandwidth, and so forth. Further, the user computing system 102 may include any type of computing system. For example, the user computing system 102 may include any type of computing device(s), such as desktops, laptops, video game platforms, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few. In some embodiments, the user computing system 102 may include one or more of the embodiments described below with respect to FIG. 10.

Typically, the user computing system 102 is capable of executing a game application 104, such as a video game, that may be stored and/or executed in a distributed environment. For example, the user computing system 102 may execute a portion of a game and the interactive computing system 120, or an application host system 122 of the interactive computing system 120, may execute another portion of the game. For instance, the game may be a massively multiplayer online role-playing game (MMORPG) that includes a client portion executed by the user computing system 102 and a server portion executed by one or more application host systems 122. For the present discussion, the application 110 can include a distributed application or an application that includes a portion that executes on the user computing system 102 and a portion that executes on at least one of the application host systems 122. The user computing system 102 may execute a host application 106. The host application 106 can be loaded into memory on the user computing system 102 and can act as an interface or hub for one or more game applications 104 that interfaces with the application host system 122.

B. Unauthorized Vendor System

The unauthorized vendor system 110, also referred to as third party vendors or grey market vendors, may be comprised of one or more systems that provides goods and services associated with a game application. The goods and services can be provided for purchase to users of a game application. The vendor 110 may provide various services including, for example, currency selling, currency trading, character leveling services, account purchase, account transfer, player purchases, virtual item purchase, and other types of transactions that can be purchased by a user. The vendors 110 are not associated with the interactive computing system 120 and are not authorized to conduct transactions on behalf of the interactive computing system 120. The transactions performed by the vendors 110 with users can be in violation of agreements between users and the interactive computing system 120 for a specific game application 104. The vendor 110 can be accessed via the network 108 and may have a website or other interface, such as an application on a mobile device, which can be accessed in order to conduct transactions with the vendor 110.

C. Interactive Computing System

The interactive computing system 120 can include one or more application host systems 122, and account data store 124, and a fraud detection system 130. The interactive computing system 120 may include one or more computing systems configured to execute a portion of the game application 104 and/or host application 106. In some embodiments, the one or more application host systems 122 can include one or more computing devices, such as servers and databases that may host and/or execute a portion of one or more instances of the game application 104 and/or host application 106. In certain embodiments, instead of or in addition to executing a portion of the game application 104 and/or host application 106, the application host systems 122 may execute another application, which may complement and/or interact with the application 104 during execution of an instance of the application 104.

1. Application Host System

The interactive computing system 120 may enable multiple users or computing systems to access a portion of the game application 104 and/or host application 106 executed or hosted by the interactive computing system 120. In some embodiments, the portion of the game application 104 executed by application host systems 122 of the interactive computing system 120 may create a persistent virtual world. This persistent virtual world may enable one or more users to interact with the virtual world and with each other in a synchronous and/or asynchronous manner. In some cases, multiple instances of the persistent virtual world may be created or hosted by the interactive computing system 120. A set of users may be assigned to or may access one instance of the persistent virtual world while another set of users may be assigned to or may access another instance of the persistent virtual world. In some embodiments, the host application system 122 may execute a hosting system for executing various aspects of a game environment. For example, in one embodiment, the game application 104 may be a competitive game, such as a first person shooter or sports game, and the host application system 122 can provide a dedicated hosting service for hosting multiplayer game instances or facilitate the creation of game instances hosted by user computing devices. In some embodiments, the host application system 122 can provide a lobby or other environment for users to virtually interact with one another. Such environments may include environments for conducting transactions between players, such as an auction house or type of environment for facilitating transactions.

2. Account Data Store

Figure 2:
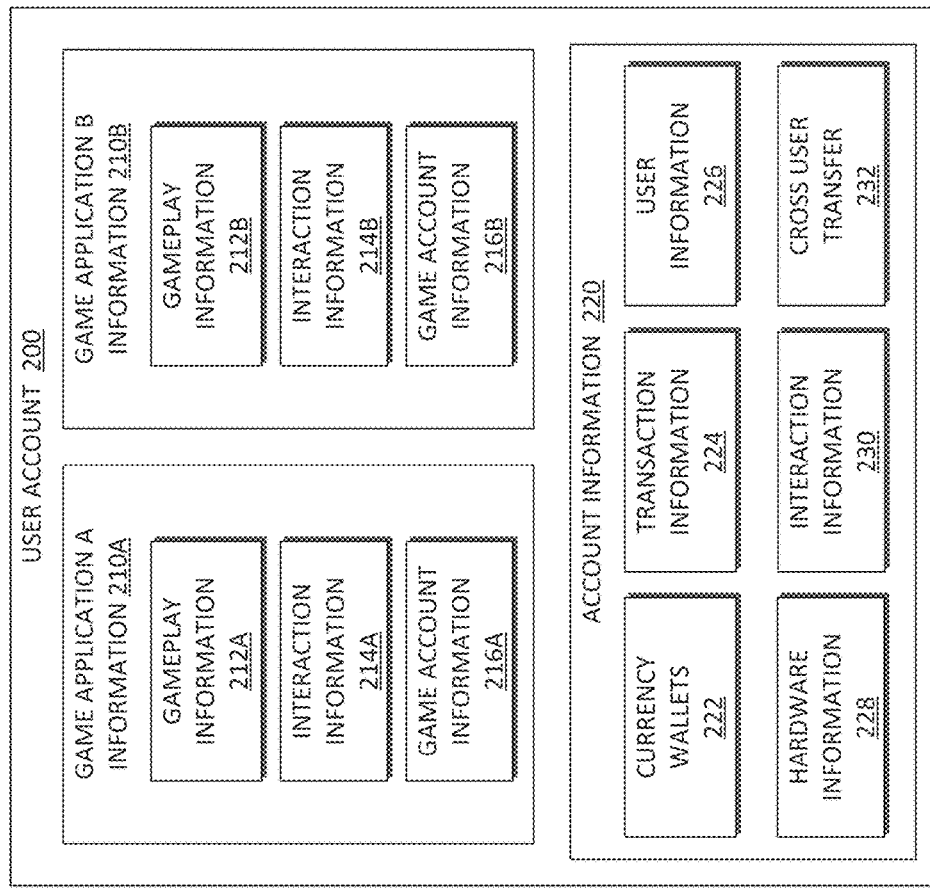
FIG. 2 illustrates as embodiment of a user account.

The interactive computing system 120 can include one or more account data stores 124 that are configured to store user account information associated with game applications hosted by the interactive computing system 120 and/or the application host systems 122. An example embodiment of user account information stored in the account data store 124 is illustrated in FIG. 2.

3. Fraud Detection System

In the illustrated embodiment, the fraud detection system 130 includes a vendor analysis system 132, an account information aggregation system 134, an account analysis system 136, a quality assurance system 138, an account modification system 140, and a feedback system 142. The fraud detection system 130 can communicate directly with user computing systems 102 and/or vendors 110 via the network 108. The fraud detection system 130 can be in communication with the application host systems 122 and/or the account data store. Each of the systems of the fraud detection system 130 will be described in more detail below.

a. Vendor Analysis System

In some embodiments, the vendor analysis system 132 can be configured to conduct transactions with vendors 110. These transactions that can be performed to determine which vendors 110 and/or which vendor accounts within a game application are engaging in activities that are in violation of terms of use established by agreements between the users and a specific game application (such as, for example, terms of service and/or an end user license agreement) or other unauthorized or unlawful activities. The vendor analysis system 132 can be configured to determine interface information associated with a vendor's interface on the web. The vendor analysis system 132 can be configured to interact with the vendor interface and automatically engage in transactions with the vendor 110. The vendor analysis system 132 can gather information associated with the transaction in order to help identify accounts that are engaging in unauthorized activities in violation of the rule set of a game application. The vendor analysis system 132 can help to identify parasitic user accounts, also referred to as true positive accounts, fraud accounts, and or grey market accounts. The accounts identified by the vendor analysis system 132 are verified to be user accounts that are in violation of the terms of use of a specific game application. In some embodiments, the vendor analysis system 132 can automatically perform the steps for transacting with the third party vendors. The vendor analysis system 132 can passively monitor and aggregate information associated with vendors 110. For example, the vendor analysis system 132 can determine the types of goods and services being offered by vendors. The vendor analysis system 132 can monitor the cost of the goods and services.

b. Account Information Aggregation System

The account information aggregation system 134 can aggregate account information associated with user accounts within game applications. The information aggregation system 134 can gather the data associated with each user account that is being monitored and processed. The information aggregation system 134 can filter the information received from the game application accounts. In some embodiments, a separate information aggregation system 134 can be associated with each game application. The information aggregation system 134 can include a rule set that is used to determine the parameters that are used for data aggregation and filtering for a specific game application. For example, the information aggregation system 134 can aggregate the type of user account information illustrated in FIG. 2. In one example, a user may have five different games associated with a user account and the account information aggregation system can collect information on all of the games and the user account information.

The information aggregation system 134 can aggregate information for verified accounts. A game application may have a system that identifies user accounts that are verified to be operated by a user that is operating the user account in accordance with the terms of use of the game application, such as terms of service and/or end user license agreement. The information aggregation system 134 can be configured to aggregate the verified account information for usage during various aspects of the fraud detection process. The verified accounts can be uses to identify the types of transactions and interactions of a legitimate user account. The information aggregation system 134 can aggregate information associated with user account within a game application and/or host application and provide the information to the account analysis system 136.

c. Account Analysis System

The account analysis system 132 can be configured generate a fraud detection model for the game application. The account analysis system 136 can utilize parasitic account information provided by the vendor analysis system 132 and the verified account information provided by the information aggregation system 134, and feedback information associated with the accounts to generate and update fraud detection models or electronic filters. The fraud detection model can be specific to a game application. The account analysis system 136 can generate the fraud detection model by determining characteristics and patterns of operation associated with the parasitic account information and the verified account information. In some embodiments, the verified user account information can be compared to the parasitic user account information to identify similarities and/or differences between the gameplay patterns of the accounts. The account analysis system can generate the fraud detection model using learning algorithms, including supervised and non-supervised machine learning algorithms.

In some embodiments, the account analysis system 132 can be configured to utilize a plurality of techniques to identify parasitic accounts. For example, human pattern recognition can be used to identify suspicious accounts based on available information sources, including, but not limited to, blogs, forums, social media feeds, vendor websites, and the like. In some embodiments, statistical methods can be employed to establish baseline thresholds that flag abnormal behaviors, such as, for example, behavior that is not possible under normal gameplay. Other techniques may include using a pre-defined sequence/order of events, which can only be generated by trusted game clients. The account analysis system and modified clients whose events do not conform to the pre-defined order of events.

In some embodiments, a signature and/or hidden signals can be used to verify that transactions originated from trusted clients, and/or can be used distinguish between normal and parasitic accounts. For example, in some embodiments, hidden menus can be implemented that are visible on modified clients, but not on a normal client. In such an embodiment, any request from the hidden menus provide a signal that can be used to help identify a parasitic account. In some embodiments, a reputation score system can be implemented to establish a reputation per player. Accounts having a reputation score above a defined threshold can be excluded from unintended restrictive measures.

The account analysis system 136 can then individually analyze and categorize each of the user accounts provided by the information aggregation system 134. The user accounts can be categorized using the fraud detection model previously generated by the account analysis system 136. The account analysis system 136 automatically analyses user account information, such as gameplay, user account activity, authentication, transfer and trade, purchases, and the like.

d. Quality Assurance System

The quality assurance system 138 can be configured evaluate the accuracy of the results of the account analysis system 136. The quality assurance system 138 may perform quality control checks on a select number of categorized accounts to verify that the accounts that are being categorized are being categorized correctly. The user accounts can be selected randomly, pseudo-randomly, at a periodic interval (for example, one in 20 accounts), or in accordance with a quality control methodology. The quality assurance system 138 can help ensure that categorized accounts are being correctly categorized. Aspects of the quality assurance system can be performed automatically or manually. In some embodiments, additional user account analysis algorithms and/or models can be used to analyze the user account information of the selected account. If the quality assurance system 138 identifies an error in the categorization, which can be referred to as a false positive, the error and false positive information can be provided to the feedback system 142 for further analysis. The quality assurance system 138 can include a user interface that outputs information associated with the user account in order for a representative to modify information associated with a user account and/or information associated with the quality assurance analysis.

e. Account Modification System

The account modification system 140 can be configured to apply account specific actions to user accounts based on a category assigned to a user account during processing by the fraud detection module. Each category can be associated with a defined account action. The account modification system can analyze information associated with the user account to determine how to apply the account action. Depending on the severity of violation, as indicated, at least in part, by the user account categorization, the account modification system 140 can apply different account actions. The account modification system can use historical information to determine the types of account actions performed on the accounts. The account actions can be independent of the categories assigned by the account analysis system 136. For example, an account action associated with a category can be changed without modifying the fraud detection model. The account actions can be applied automatically or manually. In some embodiments, an account action may include disabling access to the account, such as a temporary suspension for a defined time period (such as, for example, 24 hours, 48 hours, or another defined time period) or a permanent suspension. In some embodiments, the account actions may be configured to disrupt operation of the account. For example, the account may be subject to rate throttling, limiting, and/or response delaying mechanisms that can be configured to limit the negative impact of parasitic activities within the game application.

f. Feedback System

The feedback system 142 can be configured to generate feedback information that can be provided to the account analysis system 136 for further analysis. After application of the account action, a representative associated with the game application may be contacted by the user to dispute the account action applied to the account. The feedback system can be used to change the account action and can generate an error report indicating that the categorization of the user account resulted in a false positive. The feedback system 142 can include a user interface that outputs information associated with the user account in order for a representative to modify information associated with a user account, apply account specific actions and/or report any errors in the applied account action.

D. Network

The network 108 can include any type of communication network. For example, the network 108 can include one or more of a wide area network (WAN), a local area network (LAN), a cellular network, an ad hoc network, a satellite network, a wired network, a wireless network, and so forth. In some embodiments, the network 108 can include the Internet.

II. User Account

FIG. 2 illustrates an embodiment of a user account 200 stored in account data store 124. In the illustrated embodiment, the user account includes game application information 210 related to specific game applications 104 that are associated with the user account. For example, the user account 200 may include game application A information 210A and game application B information 210B. The user account 200 can also include account information 220, which may be independent of a game application. In some embodiments, the account information 220 may be associated with a host application 106.

A. Game Information

The game application information 210 can include information specific to a specific game application 104. In the illustrated embodiment, the game application information 210 includes gameplay information 212, interaction information 214, and game account information 216.

Gameplay information 212 may include information associated with gameplay of a user within a game environment of the game. The gameplay information may include information generated during execution of the game application by the user computing system. For example, the gameplay information 212 may include actions performed by a character within a game environment, location of a character within the game environment, length of play time, times of day, type of interactions with in-game elements, completion of in-game events, such as achievements or quests, number of matches played during a play session, authentication information, and other types of gameplay information associated with execution of a game application 104. The type of gameplay information stored by within the gameplay information 212 may be dependent upon the game application 104. For example, the gameplay information 212A may include different types of information other than the gameplay information 212B.

Interaction information 214 can include information associated with interactions between users within the game application. A user can interact with multiple other users within a game application, for example, a character can send messages, converse, trade equipment, trade currency, join a party, play a multiplayer match, and other types of interactions with users associated with other player accounts. The interaction information can include any type of interaction between user accounts within the game application. The types of interactions can be determined by the specific game application, for example, the types of interactions in a first person shooter game application can completely different than the types of interactions in an MMORPG game application. An example of interaction information exchanged between user accounts is described in more detail with respect to the embodiments disclosed in FIG. 5.

Game account information 216 may include additional information associated with a game application. For example, the game account information may include user account information (such as username, display name, email domains, date of birth, answers to security questions), user authentication information (such as, username and password), game profile information (such as, for example, settings of multiple in-game user profiles), save game files, characteristics associated with in-game characters (such as, for example, character equipment, character level, achievements, and the like), or other information.

The game application information 210 for a specific game application can be can be stored in an account data store 124 associated with the specific game application 104. For example, game application A information 210A can be stored in a data store associated with game application A and game application B information 210B can be stored in a separate and distinct data store associated with game application B. In some embodiments, the game application information for different games can be stored within same data store. In some embodiments, the account information 220 can store information identifying the various locations of game application information associated with a user account.

B. Account Information

The account information 220 can store information for the user account. In the illustrated embodiment, the account information 220 includes currency wallets 222, transaction information 224, user information 226, hardware information 228, interaction information 230, and cross user transfer information 232. In some embodiments, account information 220 can be tied to a user, in other embodiments, one or more aspects of the account information can be tied to a game application.

The currency wallet information 222 may include various types of currencies that a user may have in an account. The types of currencies can include an account balance associated with real world currencies and virtual currencies. The real world currencies can be nation specific (such as dollars, pounds, euros, and the like). The virtual currencies can be for the interactive computing system 120 or specific to a game application 104. For example, a user may have virtual currency that can be used to purchase game applications provided by the interactive computing environment 120. The virtual currency may be specific to a game application, such as gold, that can be used to purchase goods or services associated with a specific game application. For example, the virtual currency may be used to purchase an in-game character, item, game account time, and the like. In some embodiments, the virtual currency can be earned by playing the game or by purchasing the currency with real world currency through the interactive computing environment 120.

The transaction information 224 can include information associated with transactions of a user account, relating to virtual and/or real world currencies. The transaction information 224 may include, for example, credit card information, timing of the transactions, value of the transactions, speed of transactions, frequency of the transactions, location of the transactions, type of transactions, and the like. The transactions could be for the purchase of goods or services offered by the interactive computing system 120 or for transactions between users within the host application 106 and/or game applications 104.

User information 230 can include information associated with the user of a user account such as name, phone number, address, e-mail address, credit card information, date of birth, username, password, display name, answers to security questions, and the like. The user information 230 may include additional information associated with the user account, such as identification of game applications associated the a user account, identification of game modes within game applications that a user is entitled to, identification of items that are associated with the account (such as account bound items), a user handle associated with the user account, and other information that can be identify game applications associated with the account.

Hardware information 232 can include information associated with user computing systems 102 associated with a user account. The hardware information can be provided by the user or obtained by the host application system 122 and/or the interactive computing system 120. For example, in some embodiments, an agent can analyze the user computing system and provide the information to the interactive computing system 120. The hardware information can include hardware information associated with the operation of the user computing system (such as, for example, processor speed, memory type, and the like), network information (such as, for example, IP address, MAC address), and/or other information associated with the user computing system 102.

Interaction information 230 can include interactions with other users which may be external to interactions within a game application 104. For example, the interactive computing system 120 may include a chat system that allows users to communicate external to the operation of a game application. The interactive computing system 120 may include an auction house or other system that permits trading and other actions that can be performed between user accounts.

Cross user transfer information 228 can include the transfer of game accounts between user accounts. A user account associated with game application A on one user account may be transferred to a different user account. For example, a user account may wish to consolidate multiple user accounts associated with a different game applications into a single user account. The cross user transfer information 228 can maintain transfer history identifying all user accounts that were associated with a specific game application account.

III. Fraud Detection Process

Figure 3A:
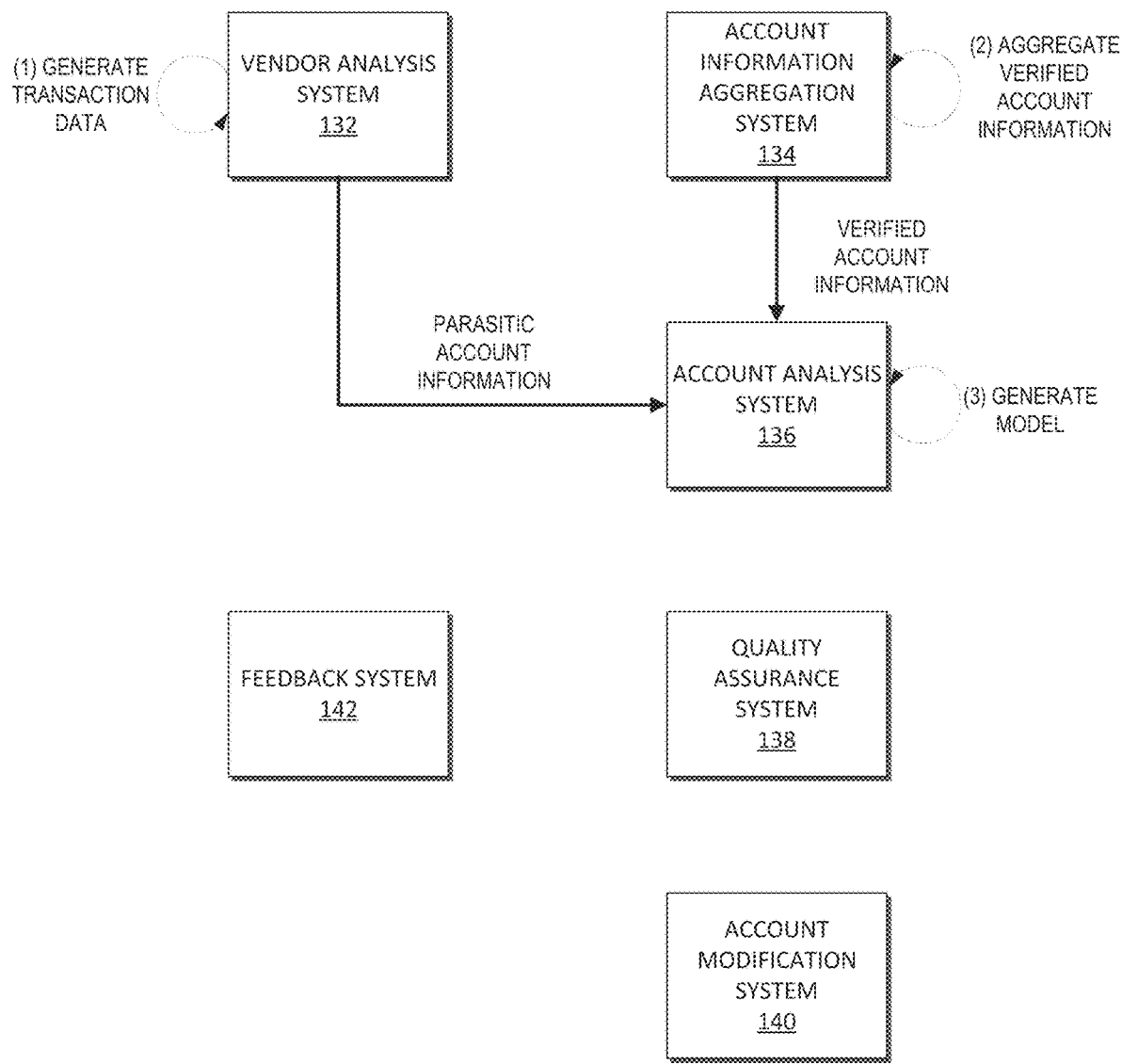
FIGS. 3A, 3B, and 3C present block diagrams illustrating embodiments of various states of a fraud detection process.
Figure 3B:
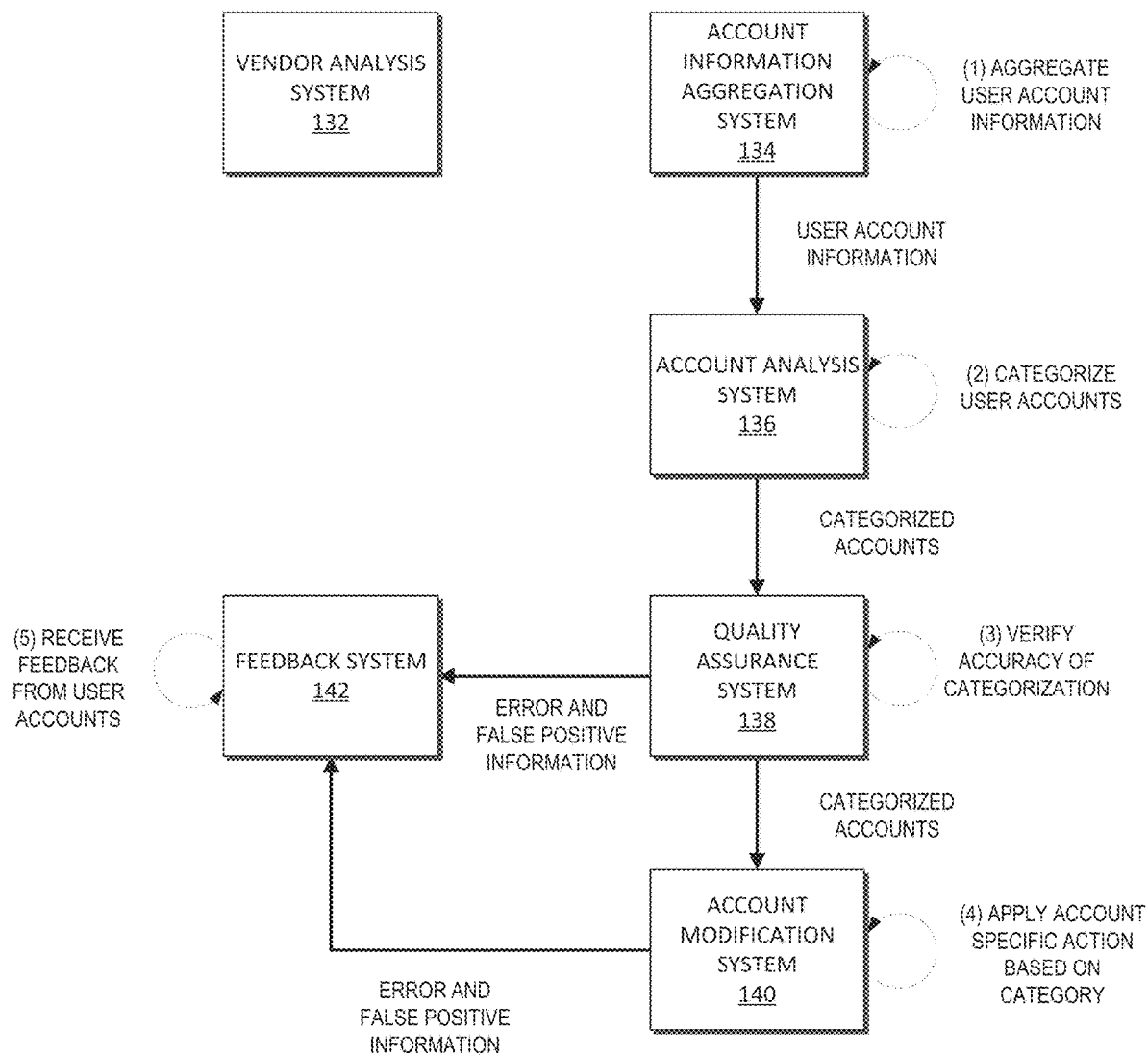
Figure 3C:
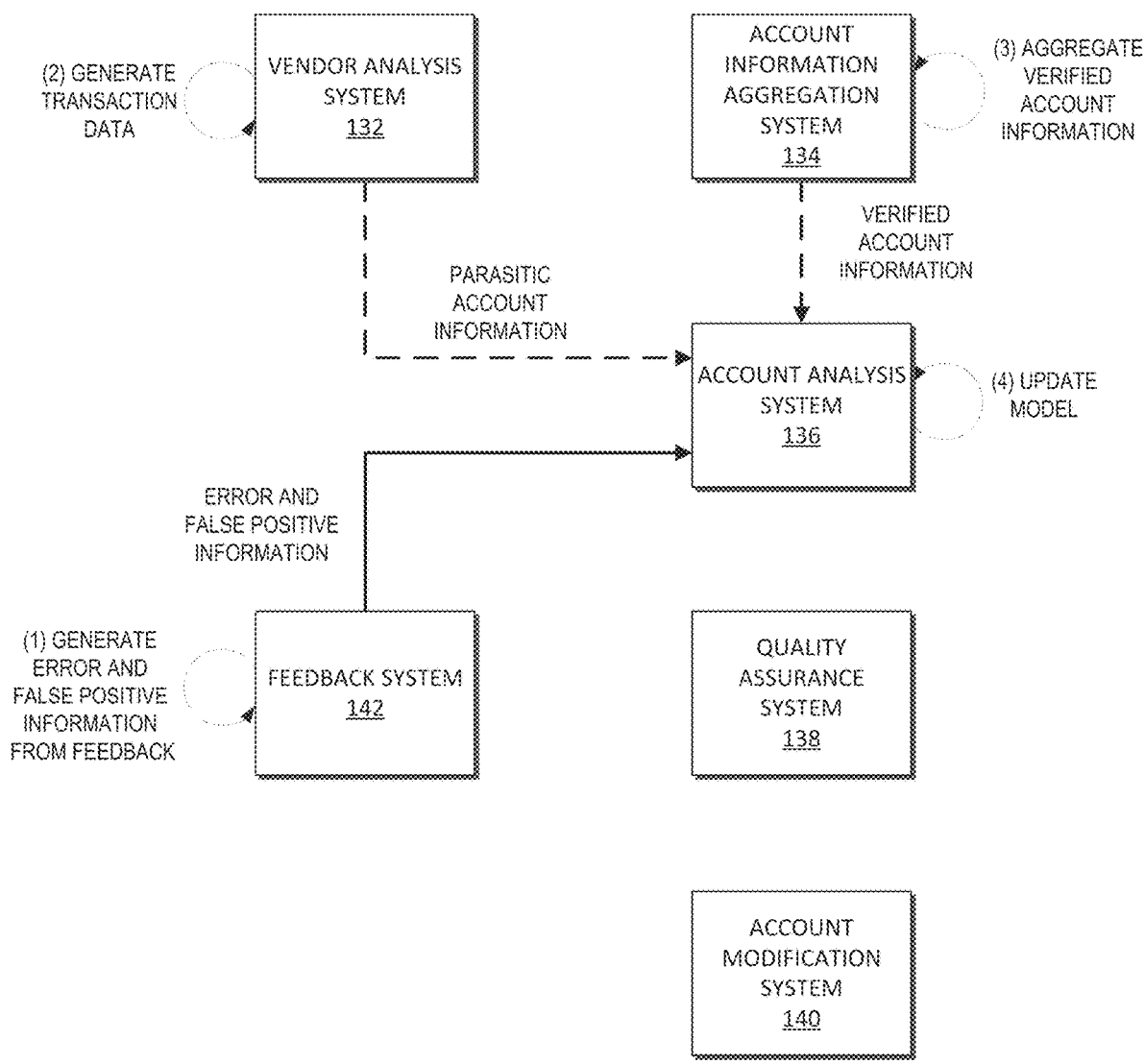

FIGS. 3A through 3C depict block diagrams of embodiments illustrating various interactions between systems of the fraud detection system 130. FIG. 3A illustrates interactions associated with generating a fraud detection model. FIG. 3B illustrates interactions associated with analysis of user accounts using the generated fraud detection model. FIG. 3C illustrates interactions associated with updating the fraud detection model.

A. Fraud Detection Model Generation

With reference now to FIG. 3A, interactions associated with generation of a fraud detection model are illustrated. At (1), the vendor analysis system 132 aggregates user account information associated with parasitic accounts within a game application. The vendor analysis system 132 can determine the user account information by performing a transaction between the vendor analysis system 132 and an unauthorized vendor 110. In some embodiments, the vendor analysis system 132 can probe vendors 110 and accounts in the game application and/or accounts employed in social networks for phishing activities. In some embodiment, the vendor analysis system 132 can execute a transaction with the vendor 110 in order to identify accounts that are engaged in activities in violation of the terms of use of the game application. In one embodiment, the vendor analysis system 132 can automate the transaction with the vendor 110. The vendor analysis system 132 can purchase goods or services, such as, for example, purchasing in-game currency. By executing the transaction, the vendor analysis system 132 can identify one or more user accounts that were utilized by the vendor 110. For example, in an instance where in-game currency is purchased, the vendor analysis system 132 user account receives the in-game currency from a vendor user account. In this instance the vendor analysis system 132 can positively identify the vendor user account as a parasitic account. Additionally, the vendor analysis system 132 can analyze the vendor account to identify other user accounts that are associated with the vendor account. For example, the vendor analysis system 132 can aggregate user account information for each or at least some of the other user accounts that the vendor account had interactions with. The vendor analysis system 132 can aggregate information for different types of transactions separately. For example, the vendor analysis system 132 can categorize the account based on the type of transaction that was executed (for example, currency selling, account selling, and the like). Example embodiments of the aggregation of parasitic user account information are described in additional detail with respect to embodiments disclosed in FIGS. 4A and 4B.

The user account information generated by the vendor analysis system 132 can be referred to as true positive information, or verified parasitic account information, in which the vendor analysis system 132 has definitively identified the accounts as violating the terms of the game application. The aggregated parasitic account information can be provided to the account analysis system 136. In some embodiments, the vendor analysis system 132 filters portions the aggregated account information prior to providing it to the account analysis system 136. In some embodiments, the aggregated account information can be provided in one or more data sets, for example, accounts associated with the same transaction can be grouped together. In some embodiments, accounts associated with the same type of transaction can be grouped together.

At (2), the information aggregation system 134 can aggregate verified user account information associated with legitimate users. The interactive computing system 120, host application system 122, or other component of a game application can identify verified accounts. The accounts can be verified using various methods. For example, employee user accounts may be used as verified accounts or accounts where a user has provided identification information identifying the identity of the user associated with the user account. The information aggregation system 134 can aggregate the verified accounts and provide the verified account information to the account analysis system 136. In some embodiments, user account information associated with accounts that interact with the verified user accounts can be provided to the account analysis system 136.

At (3), the account analysis system 136 can generate a fraud detection model for the game application. The account analysis system 136 can utilize the parasitic account information provided by the vendor analysis system 132 and the verified account information provided by the information aggregation system 134 to generate a fraud detection model. The fraud detection model can be specific to the game application. The fraud detection model can utilize the user account information from the vendor analysis system and the account information aggregation system to generate the game specific model. The user account information can include gameplay information (such as, for example, game play time, game actions, and the like), interaction information (such as, for example, number of interactions, speed of interactions, type of interactions, and the like), and game account information (such as, for example, authentication, user identification, and the like). The user account information can additionally include additional information such as, for example, currency wallets, transaction information, transfer information, user information, hardware information, or other information associated with the user account. The account analysis system 136 can generate the fraud detection model or electronic filters by determining characteristics and patterns of operation or criteria associated with the parasitic account information and the verified account information. In some embodiments, the verified user account information can be compared to the parasitic user account information to identify differences between the game play patterns of the accounts. The account analysis system 136 can use machine learning algorithms to develop and generate the model. The model can establish categories associated with different types of banned activities. Each category can use different criteria for identifying the accounts within the category. A fraud detection model can help identify accounts that engage in fraudulent activities in multiple games. If a user account is committing fraud in one game, the user account may be more likely to be committing fraud in another game. In some embodiments, the fraud detection model for a first game application can evaluate account characteristics associated with other game applications to determine whether the account is engaging in banned activities. An embodiment of the generation of the fraud detection model is described in further detail with respect to the embodiments disclosed in FIG. 6.

B. User Account Analysis

With reference now to FIG. 3B, interactions associated with analysis of user accounts using the generated fraud detection model are illustrated. At (1), the account information aggregation system 134 aggregates user account information within the game application over a defined time period. The information aggregation system 134 can collect data points from user account activity, such as authentication, game play, transfer and trade, purchase, entitlement, and the like. FIG. 2 includes examples of the types of information that can be included in a user account and provide to the account analysis system 136. The information associated with a user account can be filtered by the information aggregation system 134 to reduce the amount of information aggregated for each account. The information aggregation system 134 can select a subset of the total number of user accounts to aggregate during a given time period. In some embodiments, the account aggregation process may be a substantially continuous process where accounts are provided to the account analysis system 136 as the user account information is aggregated. In some embodiments, the user account information for a plurality of user accounts may be provided to the account analysis system 136 as a group. In some embodiments, only active user accounts are analyzed and aggregated by the information aggregation system 134. Various features can contribute in the decision making process and determination of user activity. For example, in some embodiments, time bound measurements are made within the previous 30 days, within the previous 20 days, within the previous 10 days, within the previous 48 hours, or other defined time period. The user accounts can be selected on a rolling basis in accordance with a selection algorithm. In one embodiment, accounts are prioritized based on activity level, skill lever, or other criteria of the user account. After the user account information has been aggregated, it can be provided to the account analysis system 136.

At (2), the account analysis system 136 can individually analyze and categorize each of the user accounts provided by the information aggregation system 134. The user accounts can be categorized using the fraud detection model previously generated by the account analysis system 136. The account analysis system 136 automatically analyses user account information, such as gameplay, user account activity, authentication, transfer and trade, purchases, and the like. Based on the analysis, the account analysis system 136 categorizes the user account. Each fraud detection model can include a plurality of categories. Each category can include defined criteria for identifying accounts within the category. A user account is associated with a category if the defined criteria for the category are satisfied. An account may satisfy the criteria for multiple of categories. Each category can be associated with a specific type of violation. For example, the specific type of violation may be purchasing or selling in-game currency, purchasing or selling an account, or for other types of activities that are in violation of terms of use of a specific game application. Based on the analysis, the user account can be categorized. In some embodiments, a user account is categorized as a normal account if the user account information does not satisfy the criteria for any of the defined categories. In some embodiments, a user account can be associated with a plurality of categories.

At (3), the quality assurance system 138 can evaluate the accuracy of the categorization. The quality assurance system 138 may perform quality control checks on a select number of categorized accounts to verify that the accounts that are being categorized are being categorized correctly. The user accounts can be selected randomly, pseudo-randomly, at a periodic interval (for example, one in 20 accounts), or in accordance with a quality control methodology. The quality assurance system 138 can help ensure that categorized accounts are being correctly categorized. In some embodiments, additional user account analysis algorithms and/or models can be used to analyze the user account information of the selected account. If the quality assurance system 138 identifies an error in the categorization, which can be referred to as a false positive, the error and false positive information can be provided to the feedback system 142 for further analysis. If an error is not identified, the selected accounts are provided to the account modification system 140 for further processing.

At (4), the account modification system 140 applies account specific actions based on the category associated with the account. Each category can be associated with a defined account action stored in a rules data store. The account modification system can analyze information associated with the user account to determine how to apply the account action. Depending on the severity of violation, as indicated, at least in part, by the user account categorization, the account modification system 140 can apply different account actions. In some embodiments, account actions can include, for example, electronically generate and send a warning to the user associated with the account indicating that the user account is in violation of the terms and conditions of the game application, an account suspension for a defined amount of time (for example, 24 hours, 48 hours, 1 week, and the like), termination of the user account for the specific game application, termination of the user account for all game applications associated with the user account, and other defined actions. In some embodiments, the account modification system 140 can use historical information associated with a user account to determine application of the account action. For example, multiple offenses can result in increasingly more stringent penalties. The account modification system 140 can use the historical information associated with the account to determine how to implement the account action. For example, in one implementation, a first offense results in a warning, a second offense results in a 24 hour suspension, and a third offense results in the termination of the user account for the specific game application. The account modification system 140 can automatically apply the account actions without human approval. In some embodiments, identified account actions action may require authorization by a user.

At (5), the feedback system 142 can receive error and false positive information from the quality assurance system 138 and/or the account modification system 140. The feedback system 142 can generate feedback information that can be provided to the account analysis system 136 for further analysis. After application of the account action, a representative associated with the game application may be contacted by the user to dispute the account action applied to the account. The feedback system can be used to change the account action and can generate an error report indicating that the categorization of the user account resulted in a false positive. The feedback system 142 can include a user interface that outputs information associated with the user account in order for the representative to modify the account action and/or send error information to the feedback system 142.

C. Fraud Detection Model Update

With reference now to FIG. 3C, interactions associated with updating the fraud detection model are illustrated. At (1), the feedback system can generate error and false positive information based on the feedback received from the quality assurance system 138 and/or the account modification system 140. The information received by the feedback system can be analyzed and provided to the account analysis system 136. In some embodiments, a user may be involved in the review and analysis of the false positive information prior to providing the information to the account analysis system 136. In some embodiments, at (2), the vendor analysis system 132 may aggregate account information associated with parasitic accounts, and at (3), the information aggregation system 134 may aggregate account information associated with verified accounts. The information from the vendor analysis system 132 and the information aggregation system 134 can, optionally, be provided to the account analysis system 136 for further processing with the error and false positive information received from the feedback system 142.

At (4), the account analysis system 136 can update the fraud detection model based, at least in part, on the error and false positive information received from the feedback system 142 and update the model accordingly. Depending on the specific embodiment, an update to the fraud detection model may be based, at least in part, on information received from the vendor analysis system 132 and/or information received from the information aggregation system 134 with the information received from the feedback system 142. After the fraud detection model has been updated, the fraud detection model can be used to analyze account information in accordance with the interactions described in association with FIG. 3B.

IV. Automated Transactions with Unauthorized Vendors

Figure 4A:
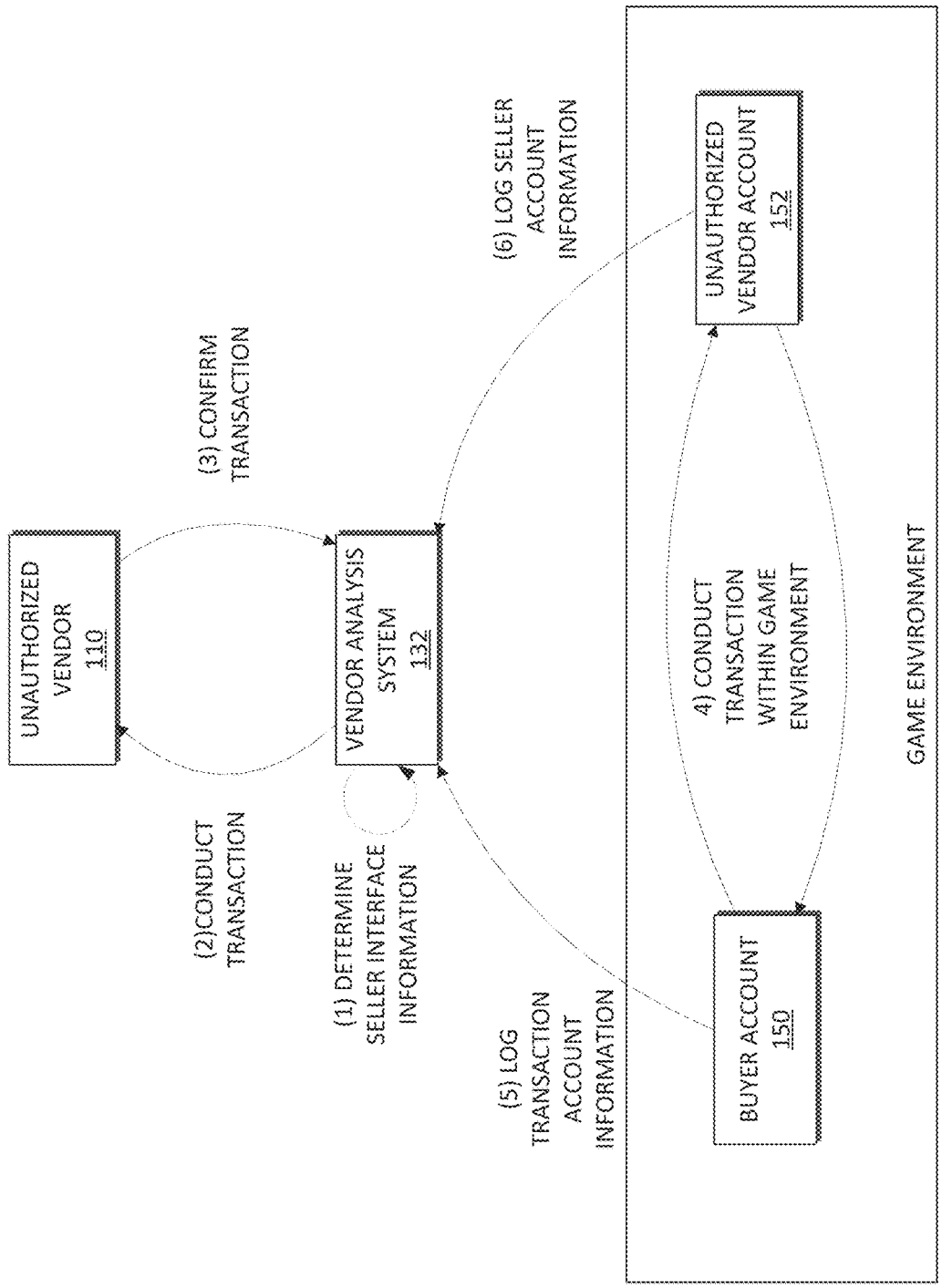
FIGS. 4A and 4B present block diagrams illustrating embodiments of various states of interactions between a vendor analysis system and a third party vendor.
Figure 4B:
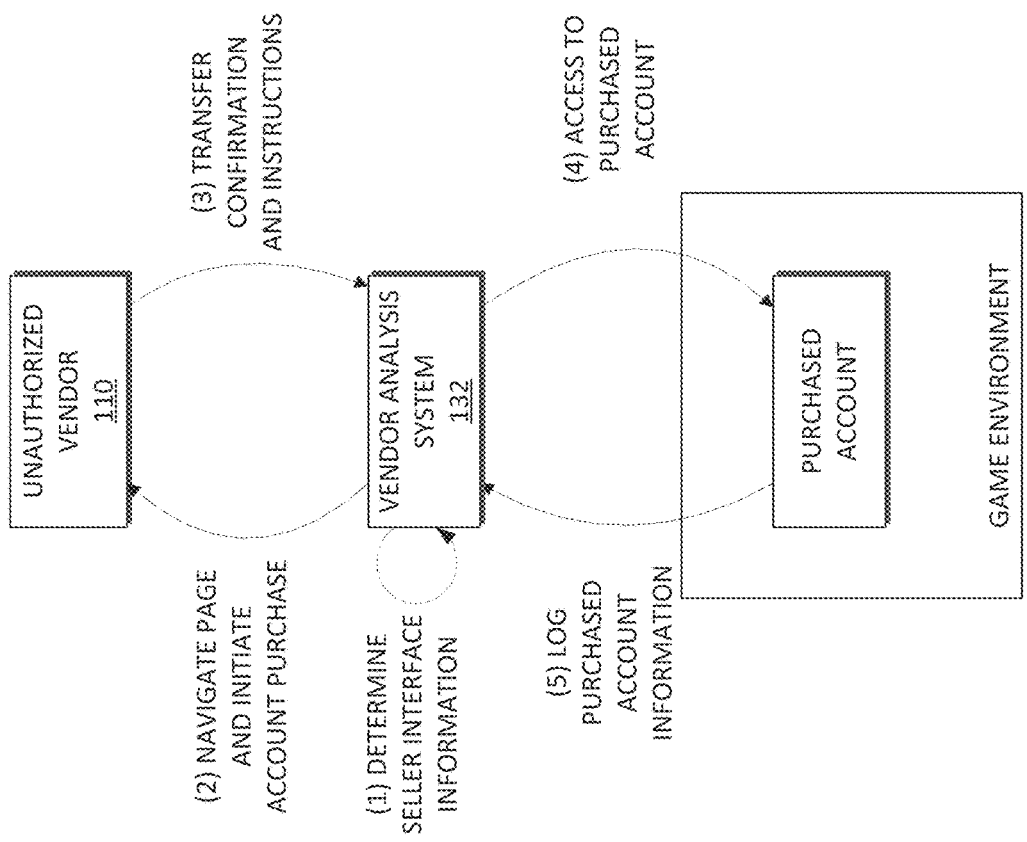

FIGS. 4A and 4B illustrate embodiments of transactions between an unauthorized third party vendor 110 and the vendor analysis system 132. FIG. 4A illustrates a transaction between a vendor 110 and the vendor analysis system 132 that can resolved within a game environment of a game application 104. The vendor analysis system 132 can automate the transactions in order to identify account credentials associated with a user account associated with the third party vendor 110.

At (1), the vendor analysis system can determine seller interface information associated with a network-based interface of the vendor 110, such as a website. The vendor analysis system 132 can identify products, services, or transactions that a vendor 110 offers. For example a vendor may offer gold selling, power leveling, account transfer and creation and other types of transactions that can be purchased by a user for a specific game application. The vendor analysis system 132 can use the information associated with the third party vendor in order to automate transactions between the vendor analysis system 132 and the vendor 110.

At (2), the vendor analysis system 132 can conduct a transaction with the vendor through the vendor's network-based interface. In some embodiments, the vendor analysis system 132 can automatically conduct the transaction without the help of a user. For example, the vendor analysis system 132 can generate a user account for the purpose of conducting the transaction or use an existing account. The vendor analysis system 132 can provide the necessary information to conduct the transaction with the third party vendor 110. For example, the vendor analysis system 132 can provide payment information, account information, contact information (such as an e-mail address), and other information used to conduct the transaction. The vendor analysis system 132 can verify that the transaction is in violation of the terms and conditions associated with the game application.

At (3), the vendor can process the transaction and provide confirmation of the transaction. The confirmation may also include instructions for fulfilling the transaction. The transaction for the purchased goods or services can be completed within the game environment of the game application. For example, a purchase of in-game currency, such as gold, may be transferred to the user account identified by the vendor analysis system 132 during the transaction by another user account within the game environment. In some instances, instructions for conducting the transaction may be provided. For example, the instructions may indicate for the user account to sell an item on the auction house for an identified price at an identified time. After the confirmation and/or instructions are received the vendor analysis system 132 can finalize the transaction within the game environment.

At (4), in the game environment the vendor analysis system 132 can access the user account associated with the transaction (referred to as the buyer account 150) as necessary in order to conduct the transaction within the game environment. An account associated with the vendor 110 (referred to as the unauthorized vendor account 152) interacts with the buyer account 150 in order to complete the transaction within the game environment. In one example, a purchase of virtual currency may be completed by the buyer account 150 receiving the virtual currency from a mail system within the game from the vendor account 152. The vendor analysis system 132 can identify the account credentials associated with the vendor account 152 based on the transaction.

At (5), the vendor analysis system 132 can log account information associated with the transaction of the buyer account 150. Such as, for example, the steps for conducting the transaction, and other information associated with performing the transaction.

At (6), the vendor analysis system 132 can log account information associated with the transaction of the vendor account 152. The vendor analysis system 132 can analyze the vendor account 152 and log any information associated with the vendor account 152. When analyzing the vendor account 152, the vendor analysis system 132 can identify other accounts associated with the vendor account 152. For example, interactions that the vendor account has had with other accounts. The vendor analysis system 132 can identify game application information 210 and user account information 220 associated with the account, as described in more detail in FIG. 2. The information associated with the vendor account 152 can be filtered and aggregated by the vendor analysis system 132.

The information aggregated by the vendor analysis system 132 provides the fraud detection system 130 with the functionality to positively identify accounts and information that that are associated with parasitic accounts. The aggregated information can be analyzed and reviewed to determine specific actions that can be used to build a model.

FIG. 4B illustrates another example of a vendor transaction that occurs external to the game application, such as account purchase or transfer. At (1), the vendor analysis system can determine seller interface information associated with a network-based interface of the vendor 110, such as a website. The vendor analysis system 132 can identify products, services, and/or other transactions that a vendor 110 offers. For example a vendor may provide account transfer and creation services, where account credentials associated with an account are transferred to a user enabling access to the account. The vendor analysis system 132 can use the information associated with the third party vendor in order to automate transactions between the vendor analysis system 132 and the vendor 110.

At (2), the vendor analysis system 132 can conduct a transaction with the vendor through the vendor's network-based interface. In some embodiments, the vendor analysis system 132 can automatically conduct the transaction without the involvement of a user. For example, the vendor analysis system 132 can provide the necessary information to conduct the transaction to with the third party vendor 110. For example, the vendor analysis system 132 can provide payment information, contact information (such as an e-mail address), and other information used to conduct the transaction. The vendor analysis system 132 can verify that the transaction is in violation of the terms and conditions associated with the game application.

At (3), the vendor can process the transaction and provide confirmation of the transaction. The confirmation may also include instructions for fulfilling the transaction. In an instance where the transaction is for the purchase or transfer of an account, the vendor 110 can provide account credentials for accessing the account. In such an instance, the transaction can be finalized without accessing the game application. After the confirmation and/or instructions are received, the vendor analysis system 132 can finalize the transaction.

At (4), the vendor analysis system 132 can access to the purchased account 154. The vendor analysis system 132 can access the purchased account to verify the account credentials provided by the vendor 110. The vendor analysis system 132 can log all the information associated with that purchased account 154. The information associated with the purchased account 154 can be used to identify interactions between the purchased account 154 and other user accounts that interact with and the purchased account. The purchased account 154 can provide valuable data for understanding the operation of an account controlled and operated by a vendor. For example, a vendor account can help identify gameplay patterns associated vendor accounts. The information associated with the purchased account 154 can be filtered and aggregated by the vendor analysis system 132.

V. Account Interaction Embodiments

Figure 5:
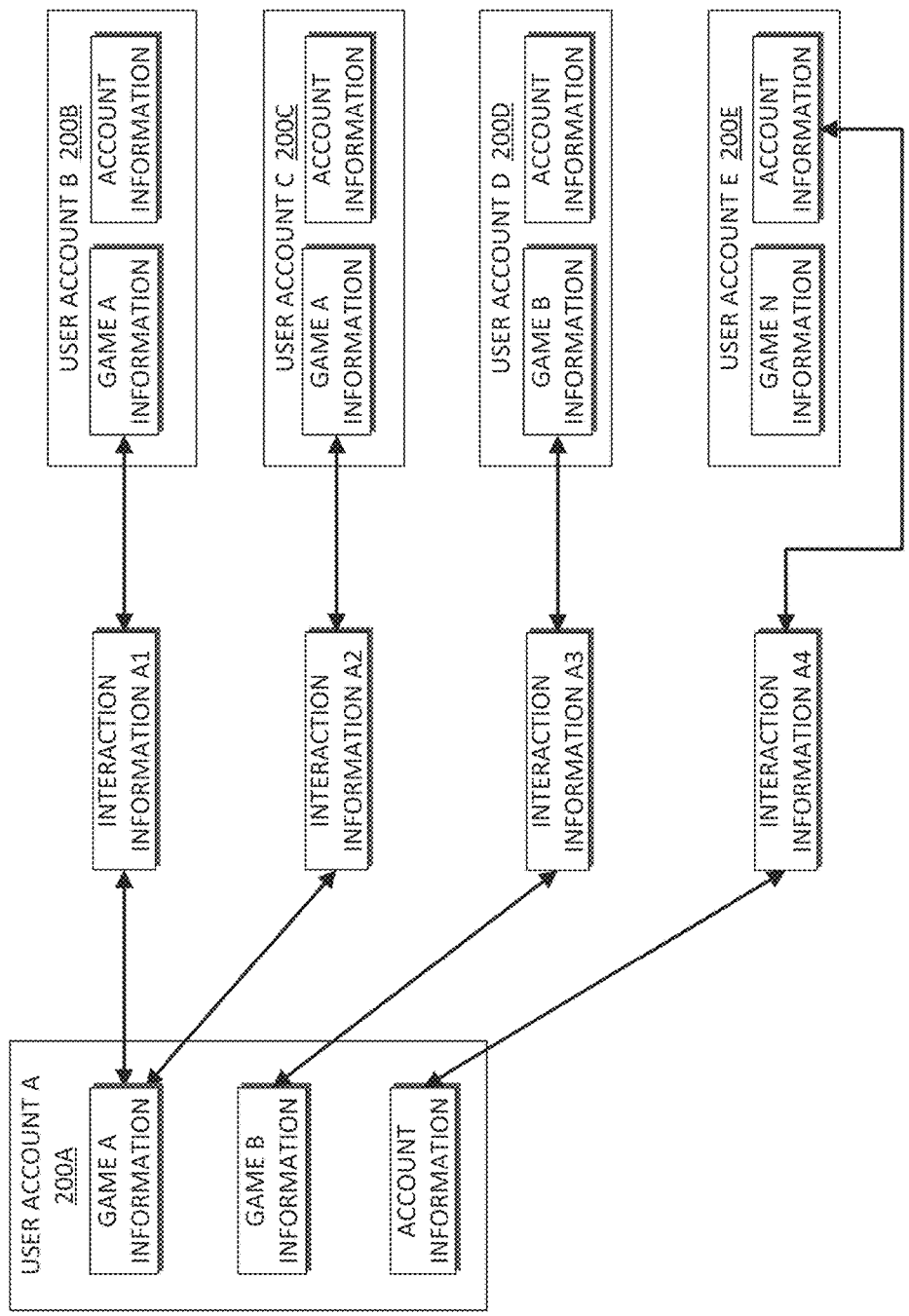
FIG. 5 illustrates an embodiment of interactions between user accounts.

FIG. 5 illustrates an example embodiment of interaction information associated with a user account 200A. In the illustrated embodiments, user account 200A can have game application A information and game application B information, such as the game application information 210A and 210B illustrated in FIG. 2. As illustrated, the user account 200A has an interaction with user account B within game application A. Interaction information A1 may include information relating to interactions between user account 200A and user account 200B, such as the transfer of virtual currency, a text chat, or other interaction between the two accounts within game application A. For example, in an example interaction A1, an in-game character associated with user account 200A transfers 500 units of virtual currency to a character associated with user account 200B. That interaction information A1 can be stored in user account 200A and/or stored in user account 200B. User account 200A can have a second interaction A2 within game application A with user account 200C. User account 200A can have a third interaction A3 within game application B with user account 200D. User account 200A can store the information associated with the interaction A3 within the game information associated with game application B. User account 200A can have an interaction with user account 200E outside of a game environment. The interaction may occur within a host application, such interactions can be stored within the account information of user account 200E and user account 200A. As illustrated, the interaction information can provide additional details that allow a single account to provide information relating to plurality of other accounts. The additional information that can be used to provide additional information for analysis and generation of fraud detection models.

VI. Fraud Detection Model Generation

Figure 6:
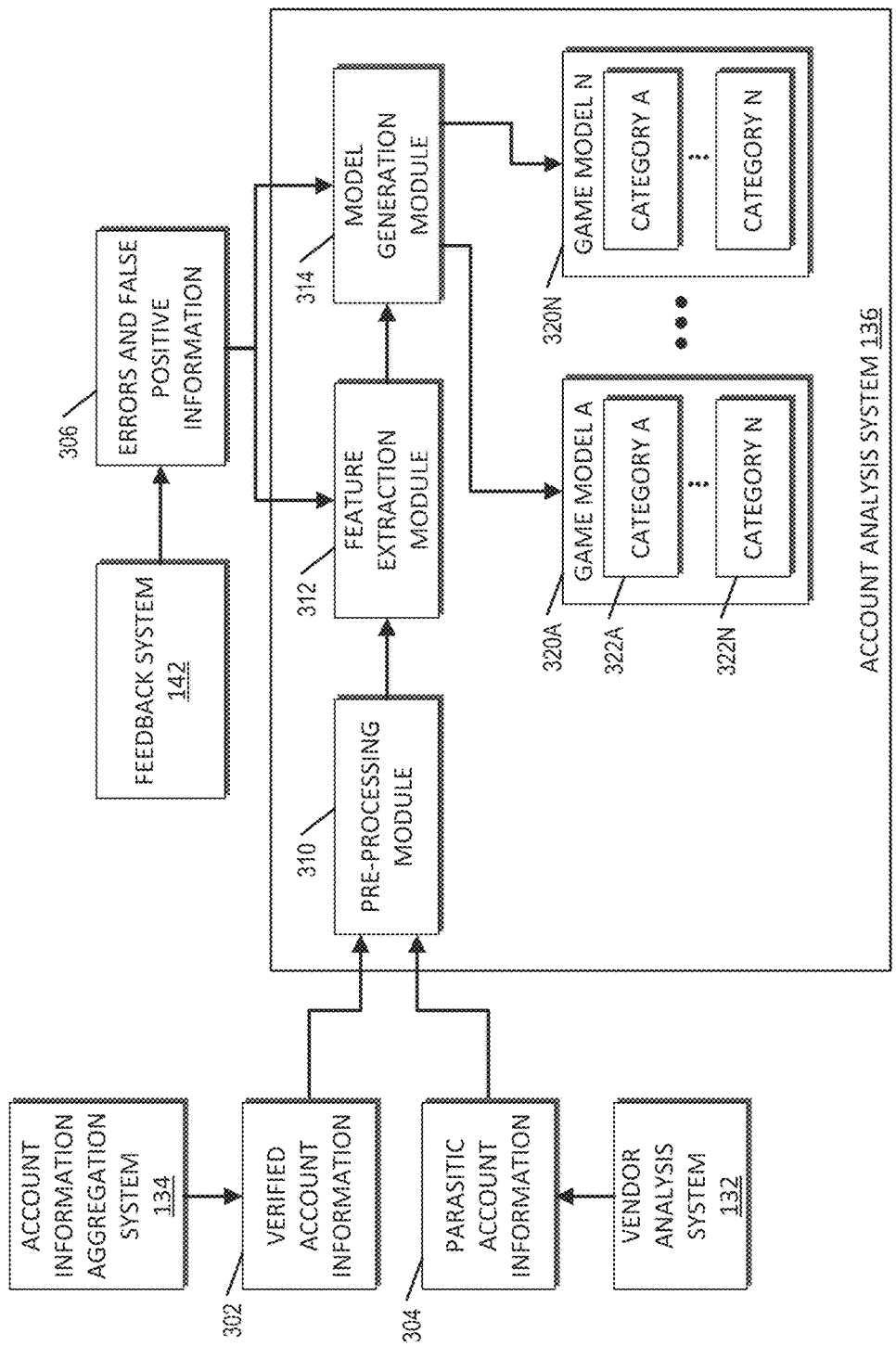
FIG. 6 presents a block diagram illustrating an embodiment of generating a fraud detection model by a fraud analysis system.

FIG. 6 illustrates an embodiment of an account analysis system 136 configured for the generation of a fraud detection model associated with a game application. The account analysis system 136 can generate the game application specific fraud detection modules 320 based, at least in part, on inputs received from the information aggregation system 134, the vendor analysis system 132, and/or the feedback system 142. The information aggregation system 134 can provide verified account information 302, the vendor analysis system 132 can provide parasitic account information 304, and the feedback system 142 can provide errors and false positive information 306.

The pre-processing module 310 can be configured to receive verified account information 302 and the parasitic account information 304. The pre-processing module can filter and clean up data sets associated with the verified account information 302 and the parasitic account information 304. The pre-processing module can filter and categorize the data sets according to the type of data. For example the data can be categorized by transaction category (such as, for example, currency selling or account selling), information type (such as, for example, gameplay information, transaction information, interaction information, game account information), or other categories associated with the accounts. The pre-processing module 310 can filter the information to identify the information for further processing. The pre-processed information can be provided to the feature extraction module 312 for further processing.

The feature extraction module 312 can identify information associated with the accounts that is relevant to identifying patterns and trends associated with the parasitic accounts. In one example, the feature extraction module 312 can identify account characteristics associated with user account information, such as username, display name, email domains, date of birth, answers to security questions, and the like. The feature extraction module 312 can identify specific types of gameplay parameters and interactions associated with the user accounts. As one example, the feature extraction module 312 can identify relevant interaction characteristics associated with user account transactions, such as, for example, deposits, withdrawals, currency transfers, number of transaction, identification of parties involved in a transaction, timing of a transaction, speed of transactions, and other types of interaction information. As another example, the feature extraction module 312 can identify gameplay characteristics, such as, for example, the amount of time played within the game application, locations of a character within the game environment, in game milestones accomplished, time required to achieve the milestones, the number of users that accessed the user account, the number and identity of IP addresses accessing the account, accumulation of in-game currency, and/or other gameplay characteristics. The characteristics can be extracted from the verified accounts and false positive information, which represent legitimate gameplay and transaction characteristics, and extracted from the parasitic account characteristics, which represent gameplay and transaction characteristics associated with accounts operating in violation of the rule set of the game application.

The model generation module 314 can generate a fraud detection model 320 for a specific game application, such a game model 320A or game model 320B. The model generation module 314 can use machine learning algorithms to apply and evaluate the characteristics extracted from the verified accounts, false positive information, and the parasitic accounts in order to generate the game specific models. The game specific models 320 can include a plurality of categories 322. Each category can be associated with a defined type(s) of behavior within the game application. Each category can have a defined criteria that is used to determine an account is operating in accordance with the identified type of behavior. For example, the account characteristics associated with purchasing virtual currency are different than the account characteristics associated with selling virtual currency. In some embodiments, a fraud detection model can be used to help identify cross game parasitic accounts. If a user account is committing fraud in one game, the user account can be more likely to be committing fraud in another game. In such embodiments, the criteria for evaluating fraud in one game application may include account characteristics associated with other game applications.

By categorizing the behavior, the fraud detection model or electronic filter can generate criteria specific to the identified behavior. For example, category A can have a first set of evaluation criteria for evaluating account characteristics, and category B can have a second set of evaluation criteria that is independent from the first set of evaluation criteria. Using the machine learning algorithms, the fraud detection module can determine the criteria for each category. When new data arrives, the such as false positive information, the criteria for the category associated with original categorization of the incorrectly identified account can be updated based on the false positive information. The models and categories can be updated as additional feedback and information is received from the various sources.

VII. User Accounts Fraud Detection Analysis

Figure 7:
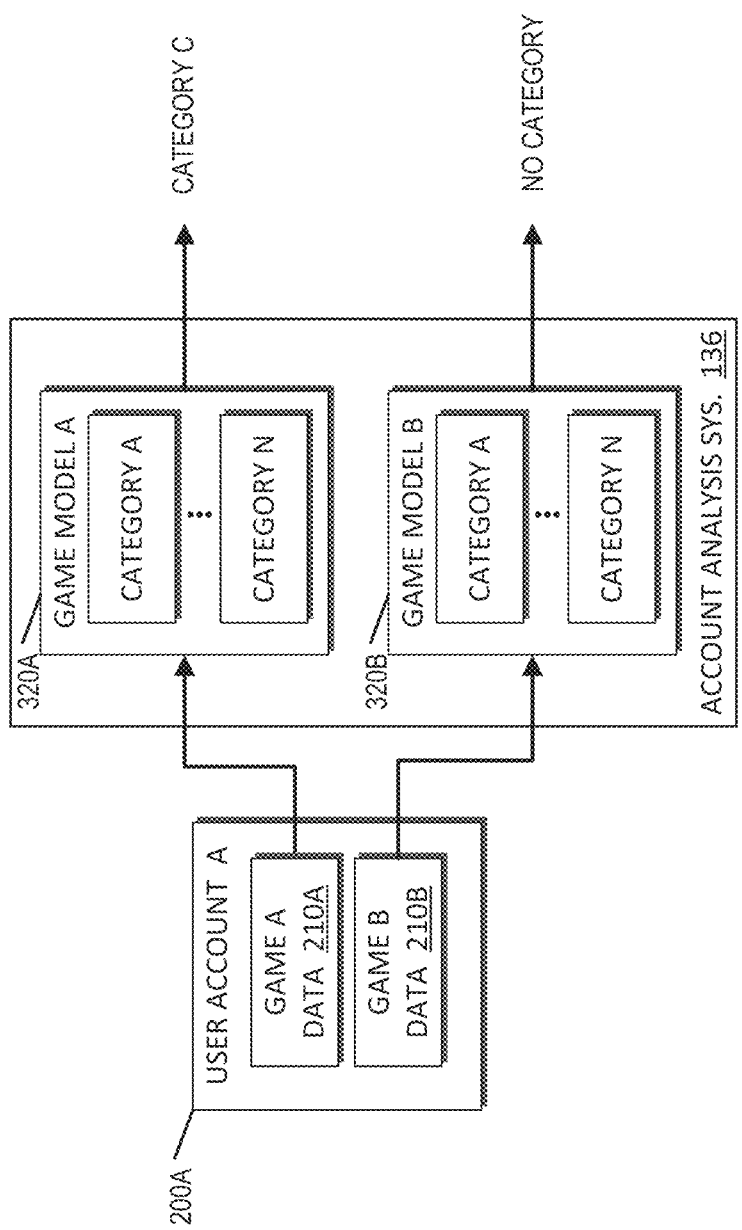
FIG. 7 presents a block diagram illustrating an embodiment of applying a fraud detection model to user accounts by a fraud analysis system.

FIG. 7 illustrates the an embodiment of processing a user account using a fraud detection module generated by the account analysis system 136. The user account 200A may have game application information associated with a plurality of games, such as game A and game B. As illustrated the account analysis system 136 includes a first fraud detection module 320A associated with game application A and a second fraud detection module 320B associated with game application B. The game application information associated with game application A is processed by the first fraud detection module 320A, and the game application information associated with game application B is processed by the second fraud detection module 320B. Application of the game model will then generate a result based on analysis of the game data for a specific user account. The account characteristics associated with the game A will be processed according to the categories within the first fraud detection model 320A. In some embodiments, the account characteristics may be processed and compared to evaluation criteria associated with each category. In some embodiments, the account characteristics may be processed in accordance with a subset of the categories within the fraud detection model.

The game application information for different game applications can be processed separately. The account analysis system 136 can apply the specific models and generate results specific to a game application. For example, in the illustrated embodiment, game model 320A determined based on the game information for game A that the account was categorized in category C, whereas in game model 320B determined based on the game information for game B that game model B no category was assigned. The processed results of the game model can be provided to the quality assurance system 138 and the account modification system 140 for application of account actions associated with the determined category C. In some embodiments, a model can be used for two or more game applications.

VIII. Process for Fraud Detection of a User Account

Figure 8:
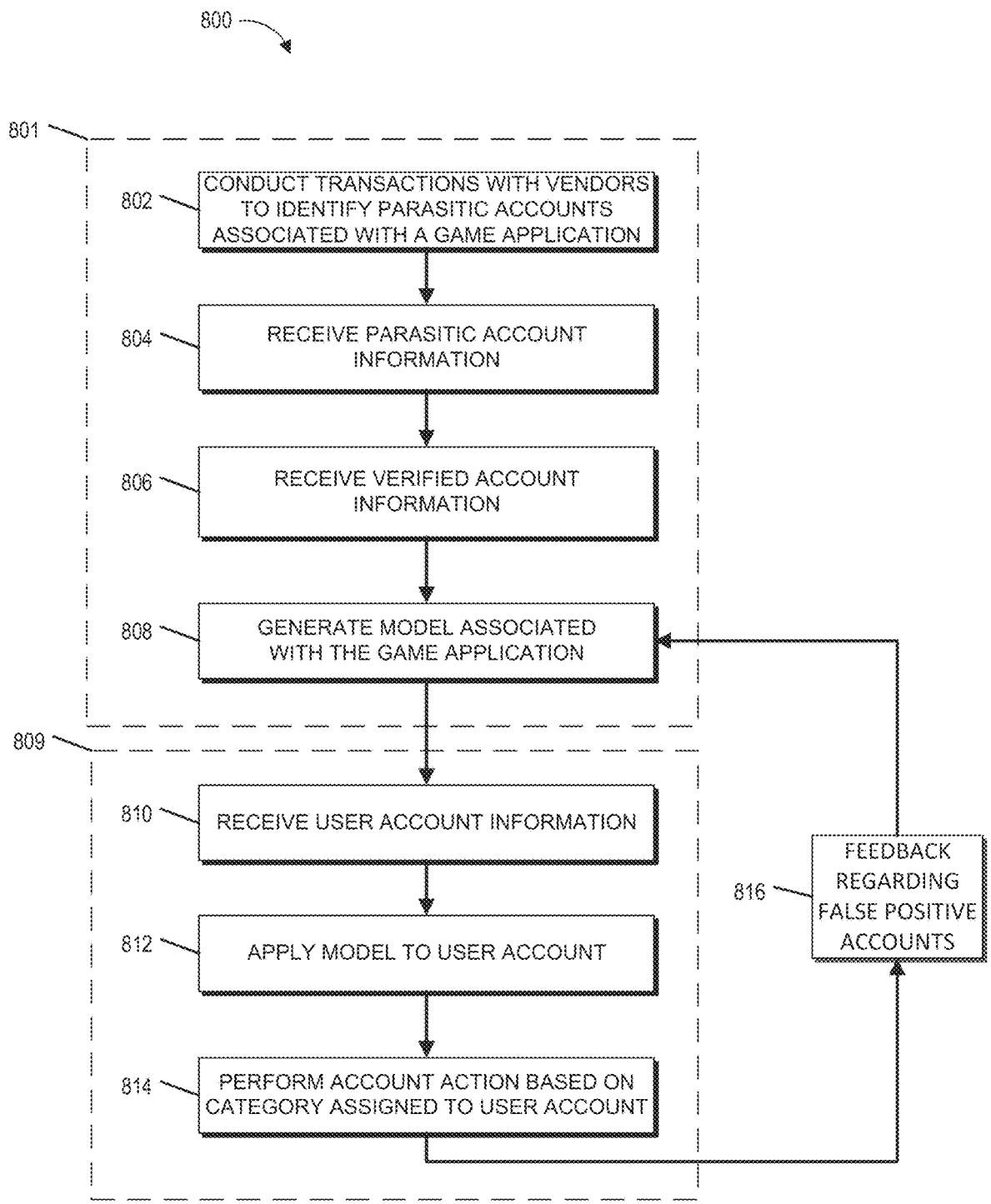
FIG. 8 illustrates a flowchart of an embodiment of a fraud detection process.

FIG. 8 illustrates an embodiment of a flowchart for a process for fraud detection of a user account within a network-based game application. The process 800 can be implemented by any system that can load and/or initiate a system for detecting unauthorized actions associated with a user account within an a game application in a network-based game environment. For example, the process 800, in whole or in part, can be implemented by a fraud detection system 130, a vendor analysis system 132, an information aggregation system 134, an account analysis system 136, or other computing system. Although any number of systems, in whole or in part, can implement the process 800, to simplify discussion, the process 800 will be described with respect to particular systems. Further, although embodiments of the process 800 may be performed with respect to with respect to variations of systems comprising various game application environments, to simplify discussion, the process 800 will be described with respect to the interactive computing system 120.

Block 801 encompasses processes associated with the generation of a fraud detection model. At block 802, the vendor analysis system 132 can conduct transactions with an unauthorized third party vendors to identify vendor accounts associated with a specific game application. The transactions can be conducted in order to identify the vendor accounts that are operating in violation of the terms of use (such as, for example, terms of service and/or an end user license agreement) of a specific game application. In some embodiments, the transactions can be performed automatically by the vendor analysis system 132. The accounts identified by the transaction can be referred to as vendor accounts or parasitic accounts.

At block 804, the vendor analysis system 132 can send the vendor account information that was identified at block 802 to the account analysis system 136. The vendor account information can include account credentials that can uniquely identify the account within the game environment. The vendor analysis system 132 can also include information identifying the type of transaction that each account is associated with. The parasitic account can include primary account information and secondary account information, identifying accounts that interacted with the primary account. For example, any transactions or interactions between the primary account and other accounts can be identified. The information associated with the various accounts can be aggregated and provided to the account analysis system 132 for further processing and fraud detection model generation.

At block 806, the account information aggregation system 134 can generate verified account information. The verified account information can be associated with accounts that are verified to be legitimate player accounts. The verified account information can be aggregated and provided to the account analysis system 132 for further processing and fraud detection model generation.

At block 808, the account analysis system 136 can generate a fraud detection model associated with the game application. The account analysis system 136 can analyze the information associated with the vendor accounts and the verified accounts in order to identify patterns, relationships, and characteristics for the identification of unauthorized behavior. After the initial model generation, the account analysis system 136 can incorporate feedback regarding the generation of false positives. The account analysis system 136 can continually receive information parasitic information, verified account information, and/or feedback information in order to continue to update the fraud detection model associated with the game application.

In some embodiments, the fraud detection model identifies the vendor accounts based on a defined criteria associated within one or more categories of behavior. For example, the categories can be associated with various unauthorized behaviors and actions, such as currency selling, account selling, and other types of unauthorized actions. In some embodiments, the fraud detection model can be applied automatically without the need for an administrator to oversee the application of the fraud detection model. The model can be generated and updated using machine learning algorithms.

Block 809 encompasses processes associated with the analysis of user accounts using the generated fraud detection model. At block 810, the account analysis system 136 receives user account information from the information aggregation system 134. The account analysis system 136 may receive user account information associated with the game application.

At block 812, the account analysis system 136 applies the fraud detection model to each of the user accounts provided by the information aggregation system 134. The user accounts can be categorized using the fraud detection model previously generated by the account analysis system 136. The account analysis system 136 can automatically analyze user account information, such as gameplay, user account activity, authentication, transfer and trade, purchases, and/or the like. Based on the analysis, the account analysis system 136 categorizes the user account. Each fraud detection model can include a plurality of categories. Each category can include defined evaluation criteria for analyzing the user accounts. A user account is associated with a category if the defined criteria for the category are satisfied. An account may satisfy the criteria for multiple of categories. Each category can be associated with a specific type of violation. For example, the specific type of violation may be purchasing or selling in-game currency, purchasing or selling an account, or for other types of activities that are in violation of rule set of specific game application. Based on the analysis, the user account is categorized. In some embodiments, a user account is categorized as a normal account if the user account information does not satisfy the criteria for any of the defined categories. In some embodiments, a user account can be associated with a plurality of categories.

At block 814, the account modification system 140 applies account specific actions based on the category associated with the account. Each category can be associated with a defined account action. The account modification system can analyze information associated with the user account to determine how to apply the account action. Depending on the severity of violation, as indicated, at least in part, by the user account categorization, the account modification system 140 can apply different account actions. In some embodiments, account actions can include, for example, a warning issued to the user account indicating that the user account is in violation of the terms and conditions of the game application, an account suspension for a defined amount of time (for example, 24 hours, 48 hours, 1 week, and the like), termination of the user account for the specific game application, termination of the user account for all game applications associated with the user account, and other defined actions. In some embodiments, more than one action can be applied. Rules can be used to decide whether to perform certain actions based on different categories and/or different games. In some embodiments, the account modification system 140 can use historical information associated with a user account to determine application of the account action. For example, multiple offenses can result in increasingly more stringent penalties. The account modification system 140 can use the historical information associated with the account to determine how to implement the account action. For example, in one implementation, a first offense results in a warning, a second offense results in a 24 hour suspension, and a third offense results in the termination of the user account for the specific game application. The account modification system 140 can automatically apply the account actions without human approval. In some embodiments, identified account actions may require authorization by a user.

At block 816, the feedback system 142 can provide receive error and false positive information from the quality assurance system and the account modification system. After application of the account action, a representative associated with the game application may be contacted by the user to dispute the account action applied to the account. The representative can change the account action and the account modification system 140 can generate an error report indicating that the categorization of the user account resulted in a false positive. The account modification system 140 can provide the error and false positive information to the feedback system 142. The feedback system 142 can analyze this information in order to generate feedback information that can be provided to at block 808 for further analysis.

Overview of Computing Device

Figure 9:
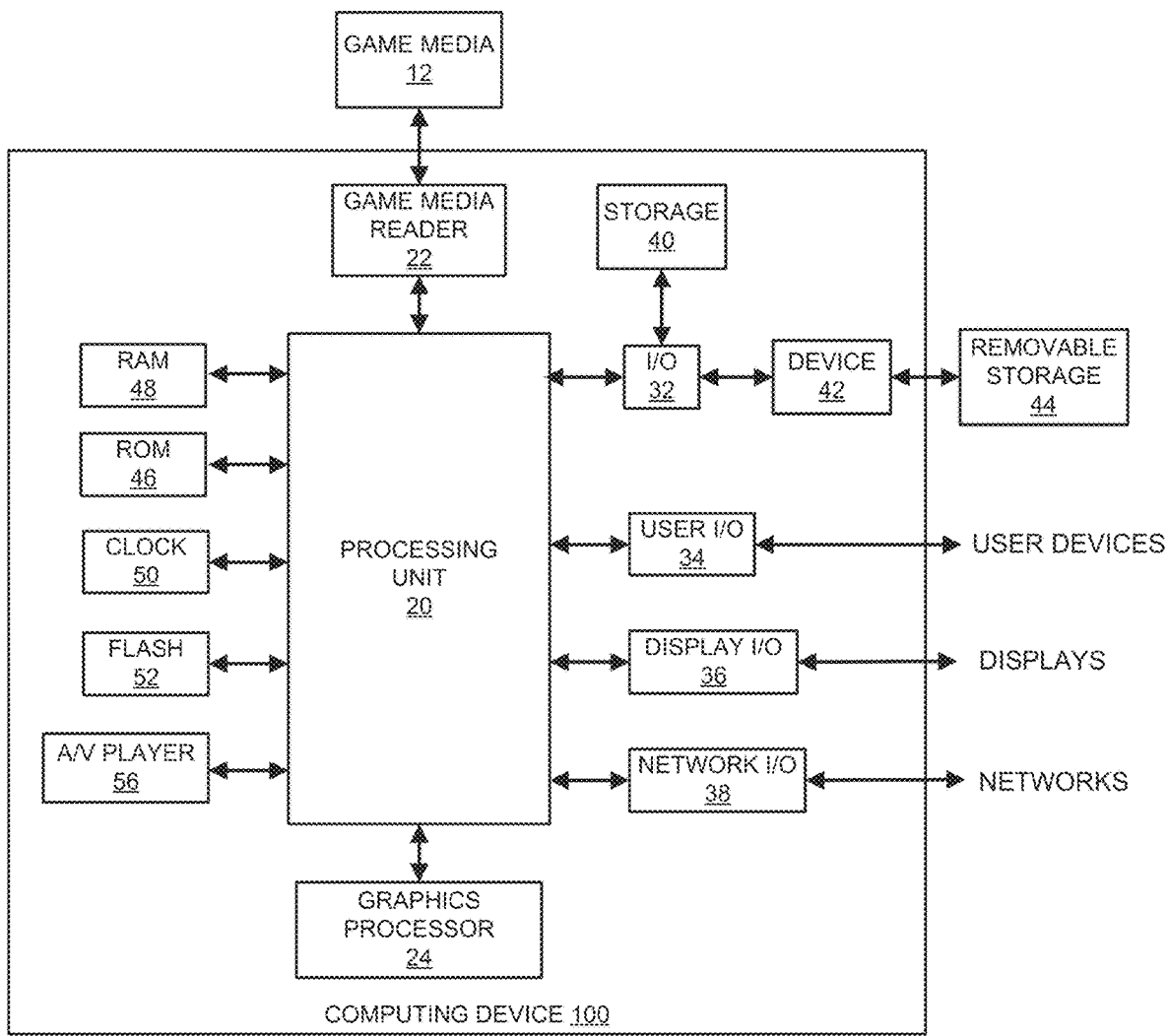
FIG. 9 illustrates an embodiment of a computing device.

FIG. 9 illustrates an embodiment of computing device 10 according to the present disclosure. Other variations of the computing device 10 may be substituted for the examples explicitly presented herein, such as removing or adding components to the computing device 100. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application of fraud detection, and/or generation of a fraud detection model.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method for generating a fraud detection model for a game application comprising:
   by a computing system including one or more processors executing computer-readable instructions,
      receiving data regarding transactions with third party vendors executed outside the game application;
      accessing user accounts from a user account data store, wherein each user account includes user account information comprising gameplay characteristics associated with execution of gameplay sessions of a game application within an interactive computing system;
      identifying parasitic user accounts within the user account data store based at least in part on the data regarding transactions with third party vendors outside the game application, wherein the data regarding transactions with the third party vendors identifies at least one verified transaction between an unauthorized third party vendor and user account credentials associated with a user account;
      identifying user account credentials associated with verified user accounts, wherein a verified user account represents an account associated with a verified player account;
      analyzing gameplay characteristics associated with the parasitic user accounts and the verified user accounts;
      generating a fraud detection model that defines a plurality of fraud detection categories for the game application, each fraud detection category is associated with evaluation criteria for identifying a defined behavior profile; and
      outputting the fraud detection model for analysis of user accounts within the game application.

2. The computer-implemented method of claim 1 further comprising identifying a type of transaction that is associated with each third party vendor.

3. The computer-implemented method of claim 1, wherein the parasitic user accounts comprise a primary user account and secondary user account information, wherein the secondary user account information identifies user accounts that interacted with the primary user account within the game application.

4. The computer-implemented method of claim 1, wherein the gameplay characteristics identify interaction characteristics associated with user account transactions, wherein the user account transactions includes at least one of: deposits, withdrawals, currency transfers, number of transaction, identification of parties involved in a transaction, timing of a transaction, or speed of transactions.

5. The computer-implemented method of claim 1, wherein the gameplay characteristics include at least one of: an amount of time played within the game application, locations of a character within a virtual game environment, in game milestones accomplished, time required to achieve the game milestones, a number of users that accessed the user account, a number and identity of IP addresses accessing the account, or an accumulation of in-game currency.

6. The computer-implemented method of claim 1, wherein analyzing gameplay characteristics further comprises identifying actions that represent legitimate gameplay and transaction characteristics from the verified user accounts, and identifying actions that represent fraudulent gameplay and transaction characteristics associated with parasitic user accounts.

7. The computer-implemented method of claim 1, wherein each fraud detection category has a defined criteria that is used to determine whether an account is operating in accordance with the defined behavior profile.

8. The computer-implemented method of claim 1, wherein each fraud detection category is associated with a different defined behavior profile.

9. The computer-implemented method of claim 1, wherein the fraud detection model is a machine learning model.

10. The computer-implemented method of claim 1 further comprising identifying a second game application associated with a parasitic user account based at least in part on the parasitic user accounts.

11. A computing system comprising:
a user account data store configured to store user account information for a plurality of user accounts;
one or more processors in electronic communication with the user account data store and configured to execute computer-readable instructions that configure the one or more processors to:
receive data regarding transactions with third party vendors executed outside a game application;
access user accounts from a user account data store, wherein each user account includes user account information comprising gameplay characteristics associated with execution of gameplay sessions of a game application within an interactive computing system;
identify parasitic user accounts within the user account data store based at least in part on the data regarding transactions with third party vendors outside the game application, wherein the data regarding transactions with the third party vendors identifies at least one verified transaction between an unauthorized third party vendor and user account credentials associated with a user account;
identify user account credentials associated with verified user accounts, wherein a verified user account represents an account associated with a verified player account;
analyze gameplay characteristics associated with the parasitic user accounts and the verified user accounts;
generate a fraud detection model that defines a plurality of fraud detection categories for the game application, each fraud detection category is associated with evaluation criteria for identifying a defined behavior profile; and
output the fraud detection model for analysis of user accounts within the game application.

12. The computing system of claim 11, wherein computer-readable instructions further configure the one or more processors to identify a type of transaction that is associated with each third party vendor.

13. The computing system of claim 11, wherein the parasitic user accounts comprise a primary user account and secondary user account information, wherein the secondary user account information identifies user accounts that interacted with the primary account within the game application.

14. The computing system of claim 11, wherein the gameplay characteristics identify interaction characteristics associated with user account transactions, wherein the user account transactions includes at least one of: deposits, withdrawals, currency transfers, number of transaction, identification of parties involved in a transaction, timing of a transaction, or speed of transactions.

15. The computing system of claim 11, wherein the gameplay characteristics include at least one of: an amount of time played within the game application, locations of a character within a virtual game environment, in game milestones accomplished, time required to achieve the game milestones, a number of users that accessed the user account, a number and identity of IP addresses accessing the account, or an accumulation of in-game currency.

16. The computing system of claim 11, wherein computer-readable instructions further configure the one or more processors to identify actions that represent legitimate gameplay and transaction characteristics from the verified user accounts, and identify actions that represent fraudulent gameplay and transaction characteristics associated with parasitic user accounts.

17. The computing system of claim 11, wherein each fraud detection category has a defined criteria that is used to determine whether an account is operating in accordance with the defined behavior profile.

18. The computing system of claim 11, wherein each fraud detection category is associated with a different defined behavior profile.

19. The computing system of claim 11, wherein computer-readable instructions further configure the one or more processors to identify a second game application associated with a parasitic user account based at least in part on the parasitic user accounts.

20. A non-transitory computer readable medium comprising computer-executable instructions that, when executed by a computing system, causes the computing system to:
receive data regarding transactions with third party vendors executed outside a game application;
access user accounts from a user account data store, wherein each user account includes user account information comprising gameplay characteristics associated with execution of gameplay sessions of a game application within an interactive computing system;
identify parasitic user accounts within the user account data store based at least in part on the data regarding transactions with third party vendors outside the game application, wherein the data regarding transactions with the third party vendors identifies at least one verified transaction between an unauthorized third party vendor and user account credentials associated with a user account;
identify user account credentials associated with verified user accounts, wherein a verified user account represents an account associated with a verified player account;
analyze gameplay characteristics associated with the parasitic user accounts and the verified user accounts;
generate a fraud detection model that defines a plurality of fraud detection categories for the game application, each fraud detection category is associated with evaluation criteria for identifying a defined behavior profile; and
output the fraud detection model for analysis of user accounts within the game application.

* * * * *